US010606472B2

(12) United States Patent
Kwon et al.

(10) Patent No.: US 10,606,472 B2
(45) Date of Patent: Mar. 31, 2020

(54) MOBILE TERMINAL AND CONTROL METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/751,804

(22) PCT Filed: May 24, 2016

(86) PCT No.: PCT/KR2016/005473
§ 371 (c)(1),
(2) Date: Feb. 9, 2018

(87) PCT Pub. No.: WO2017/026632
PCT Pub. Date: Feb. 16, 2017

(65) Prior Publication Data
US 2018/0239527 A1  Aug. 23, 2018

(30) Foreign Application Priority Data
Aug. 10, 2015  (KR) .................. 10-2015-0112331

(51) Int. Cl.
G04G 21/04       (2013.01)
G06F 3/0488      (2013.01)
(Continued)

(52) U.S. Cl.
CPC ......... *G06F 3/04883* (2013.01); *G04G 21/04* (2013.01); *G06F 1/163* (2013.01);
(Continued)

(58) Field of Classification Search
CPC ........ G06F 1/163; G06F 3/01; G06F 3/04883; G06F 3/16; G04G 21/04; G06T 11/001; G06T 11/20; H04M 1/72555
See application file for complete search history.

(56) References Cited

U.S. PATENT DOCUMENTS

2008/0010614 A1\* 1/2008 Lee ................... H04M 1/72555
715/843
2008/0079751 A1\* 4/2008 Arrasvuori ........ H04M 1/72547
345/629
(Continued)

FOREIGN PATENT DOCUMENTS

CN         104639715 A    5/2015
EP          2180677 A2    4/2010
(Continued)

*Primary Examiner* — Hong Zhou
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to display a drawing pad on the touch screen in response to a predetermined input; display a user interface on the touch screen to set a display time at which a drawing drawn on the drawing pad is displayed at a reception side terminal; and transmit a message including the drawing to the reception side terminal, via the wireless communication unit, so the drawing is displayed on the screen of the reception side terminal at the display time set in the user interface.

18 Claims, 36 Drawing Sheets

(51) Int. Cl.
*G06F 1/16* (2006.01)
*G06T 11/00* (2006.01)
*G06T 11/20* (2006.01)
*G06F 3/16* (2006.01)
*G06F 3/01* (2006.01)
*H04M 1/725* (2006.01)

(52) U.S. Cl.
CPC ............... *G06F 3/01* (2013.01); *G06F 3/16* (2013.01); *G06T 11/001* (2013.01); *G06T 11/20* (2013.01); *H04M 1/72555* (2013.01)

(56) References Cited

U.S. PATENT DOCUMENTS

| | | | |
|---|---|---|---|
| 2010/0103243 A1* | 4/2010 | Won | H04M 1/72555 348/14.02 |
| 2010/0306718 A1 | 12/2010 | Shim et al. | |
| 2012/0302167 A1* | 11/2012 | Yun | G06F 3/04883 455/41.2 |
| 2013/0050109 A1* | 2/2013 | Ban | G06F 3/04883 345/173 |
| 2014/0095631 A1 | 4/2014 | Ravi et al. | |
| 2014/0176426 A1* | 6/2014 | Morohoshi | G04R 20/26 345/156 |
| 2015/0062097 A1 | 3/2015 | Chung et al. | |
| 2015/0135129 A1* | 5/2015 | Kwon | G06F 3/0488 715/781 |

FOREIGN PATENT DOCUMENTS

| | | |
|---|---|---|
| EP | 2355472 A2 | 8/2011 |
| KR | 10-2005-0041629 A | 5/2005 |
| KR | 10-0770932 B1 | 10/2007 |
| KR | 10-2011-0013653 A | 2/2011 |
| KR | 10-2014-0080788 A | 7/2014 |
| KR | 10-2015-0086032 A | 7/2015 |
| KR | 10-2015-0088041 A | 7/2015 |

* cited by examiner

【Figure 1A】
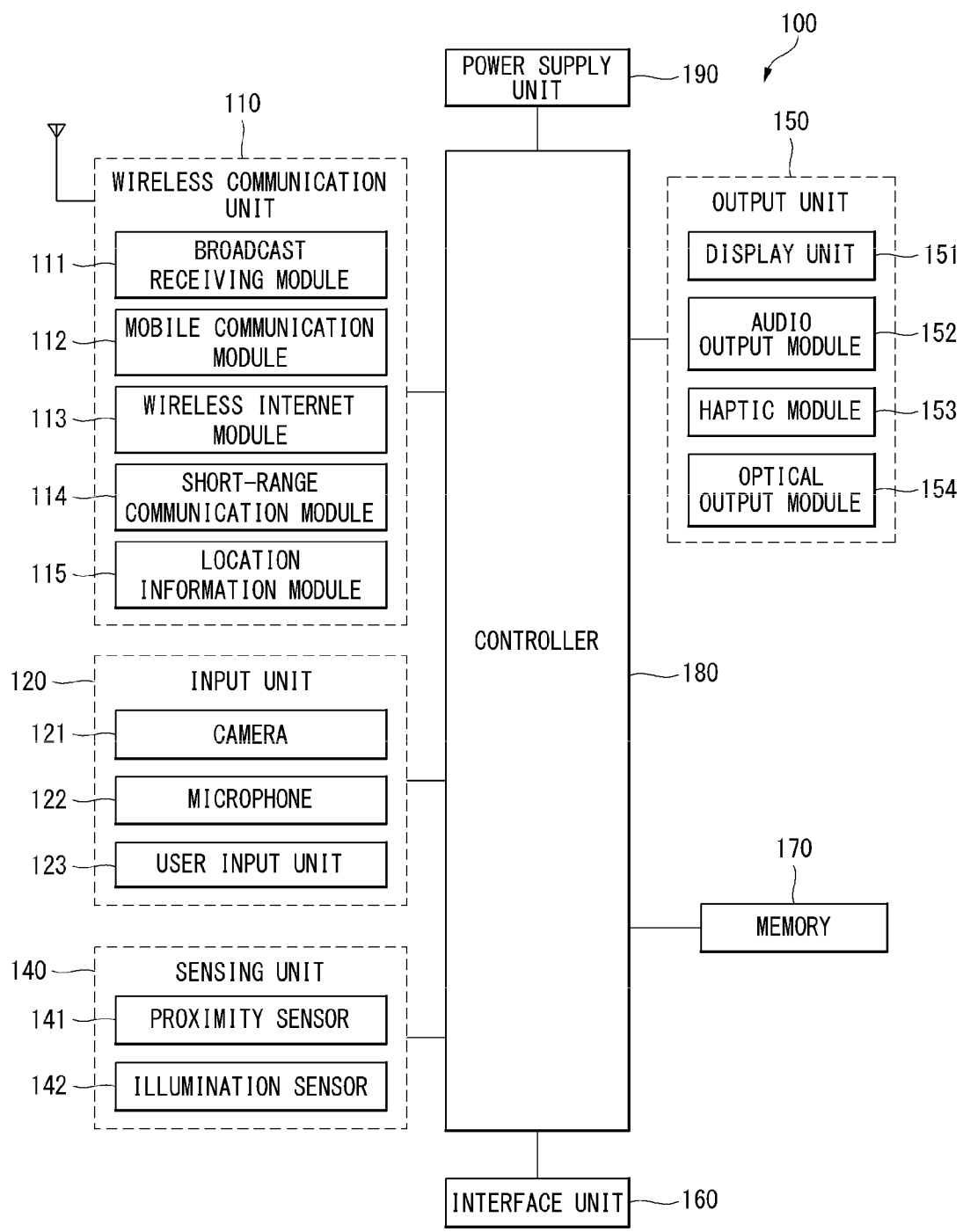

【Figure 1B】
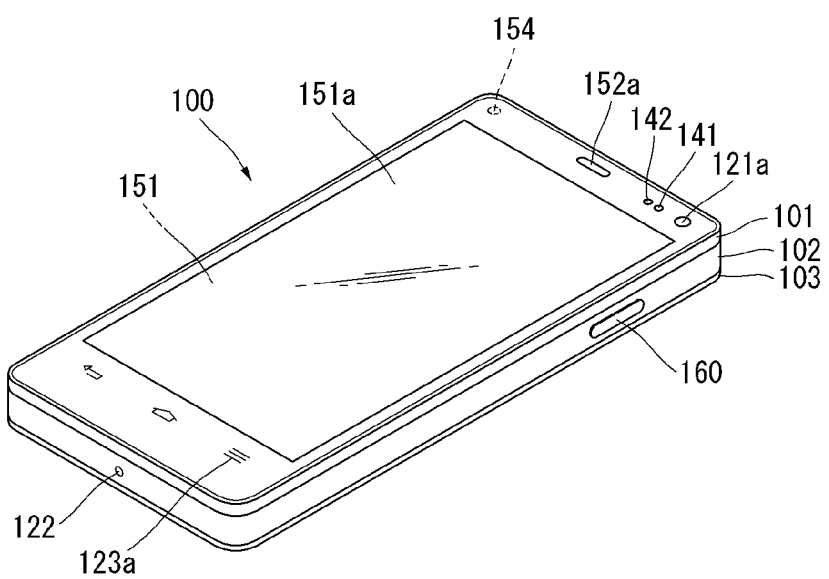

[Figure 1C]
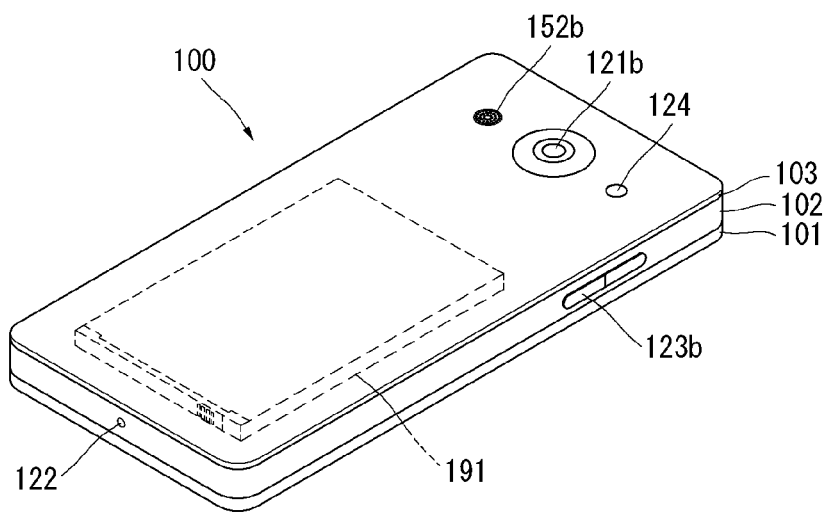

【Figure 1D】
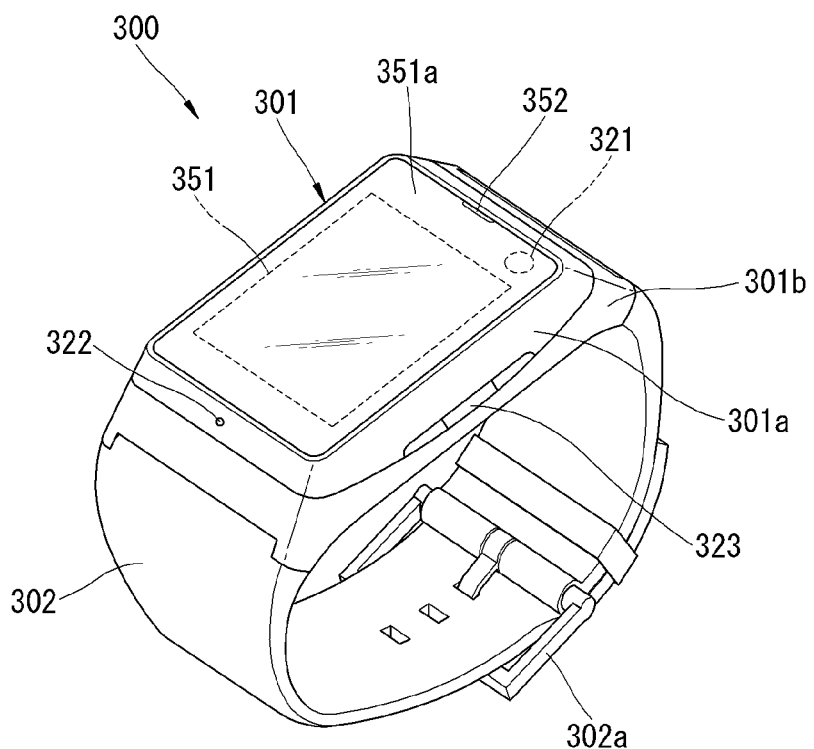

【Figure 2】
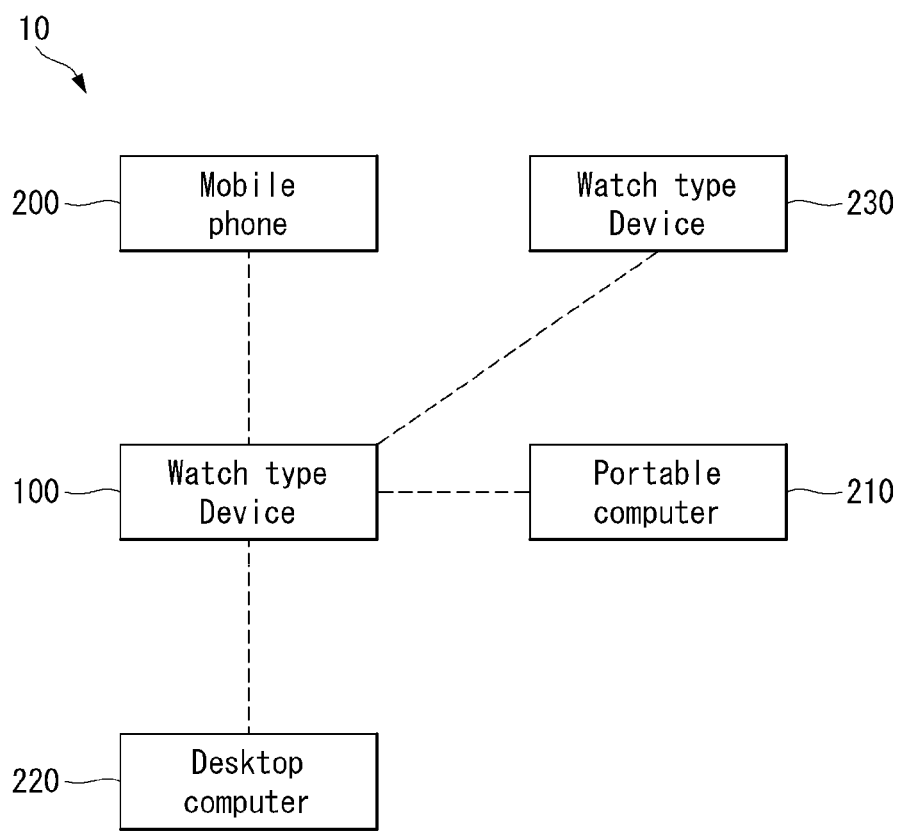

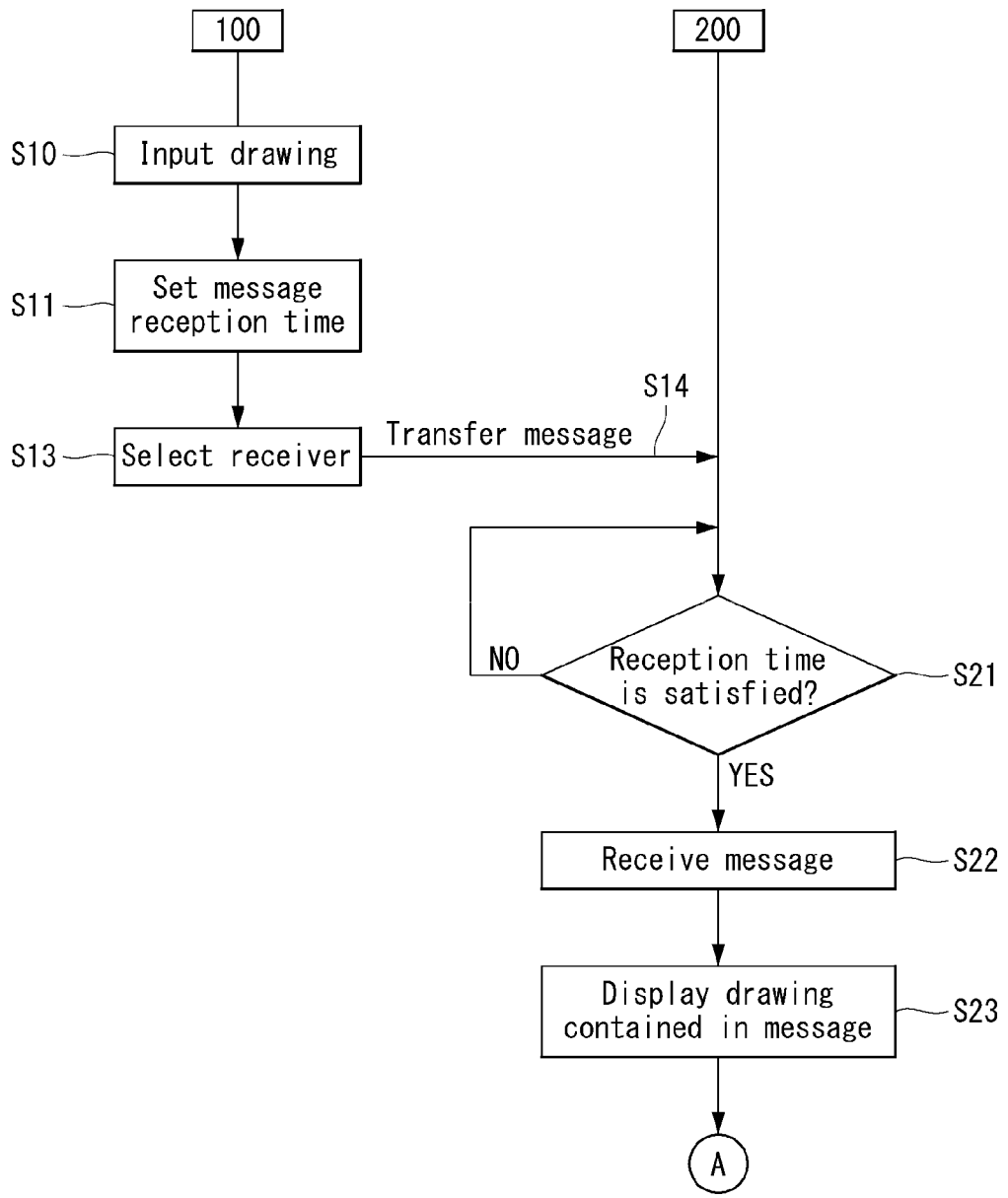
[Figure 3]

【Figure 4】
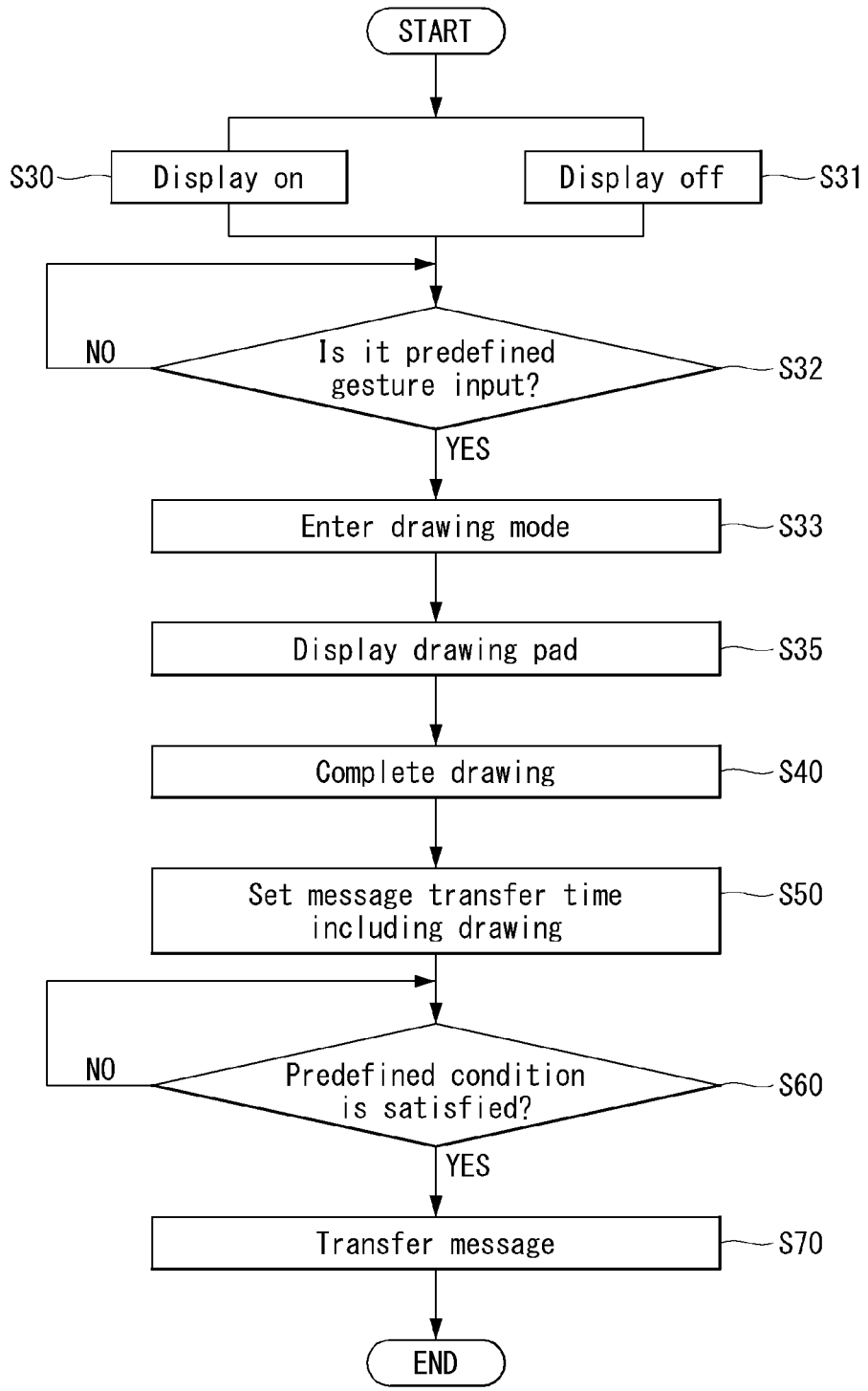

【Figure 5A】
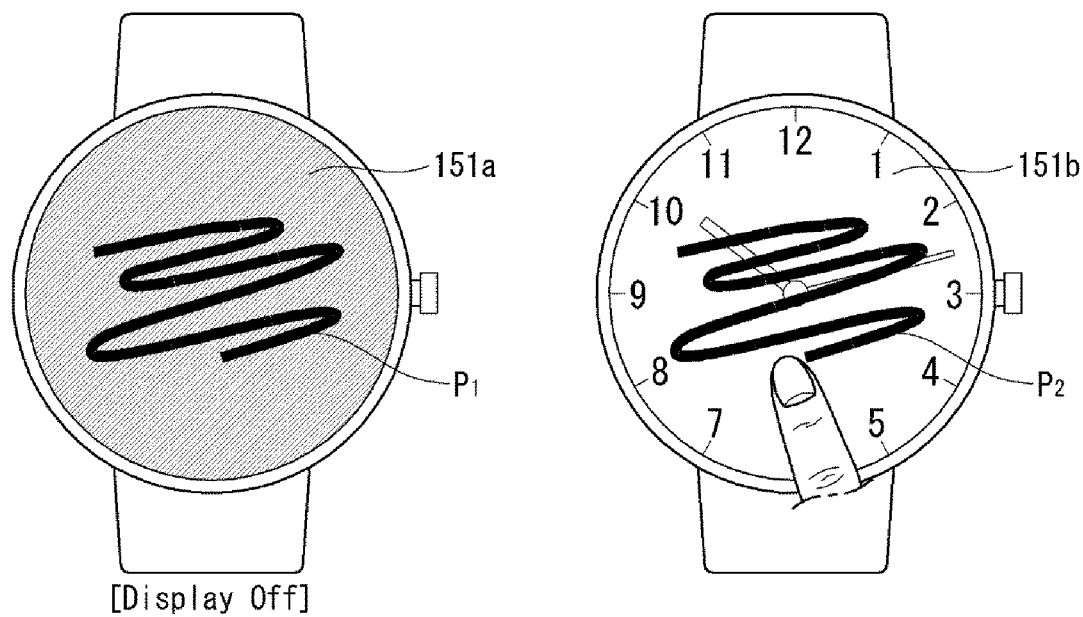

【Figure 5B】
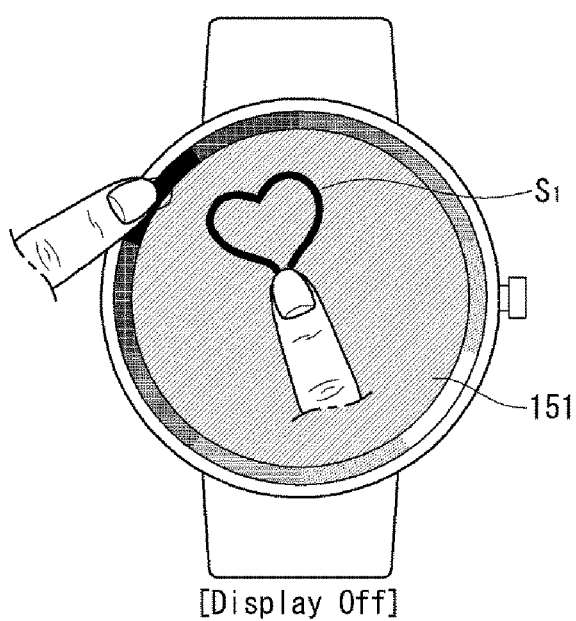

【Figure 6A】
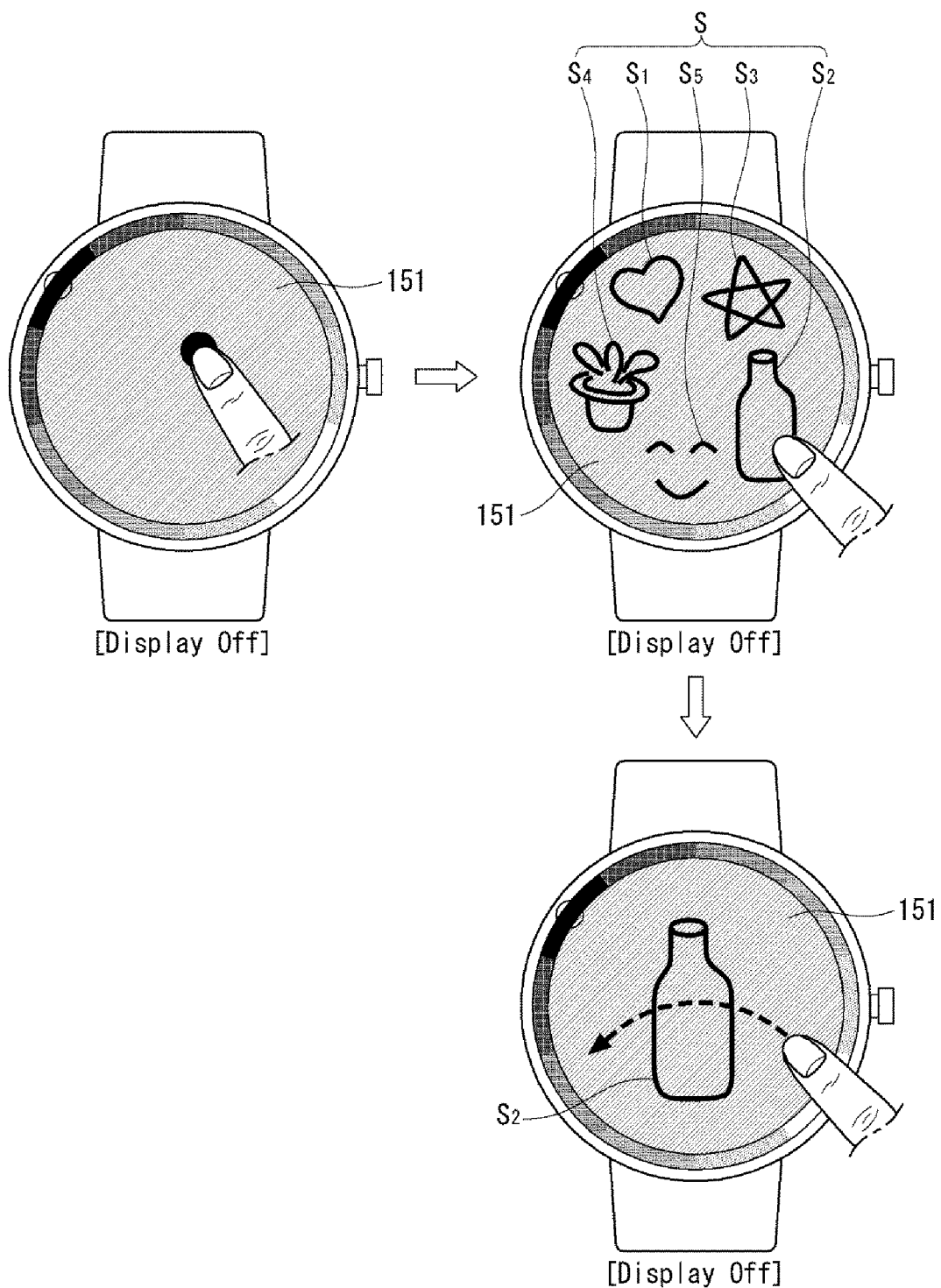

【Figure 6B】
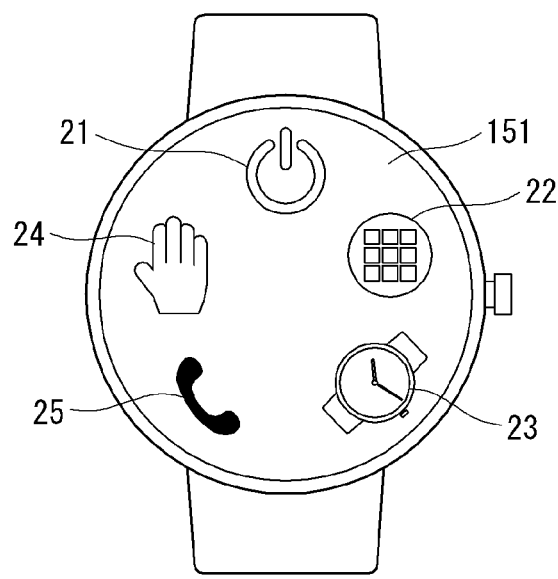

【Figure 7A】
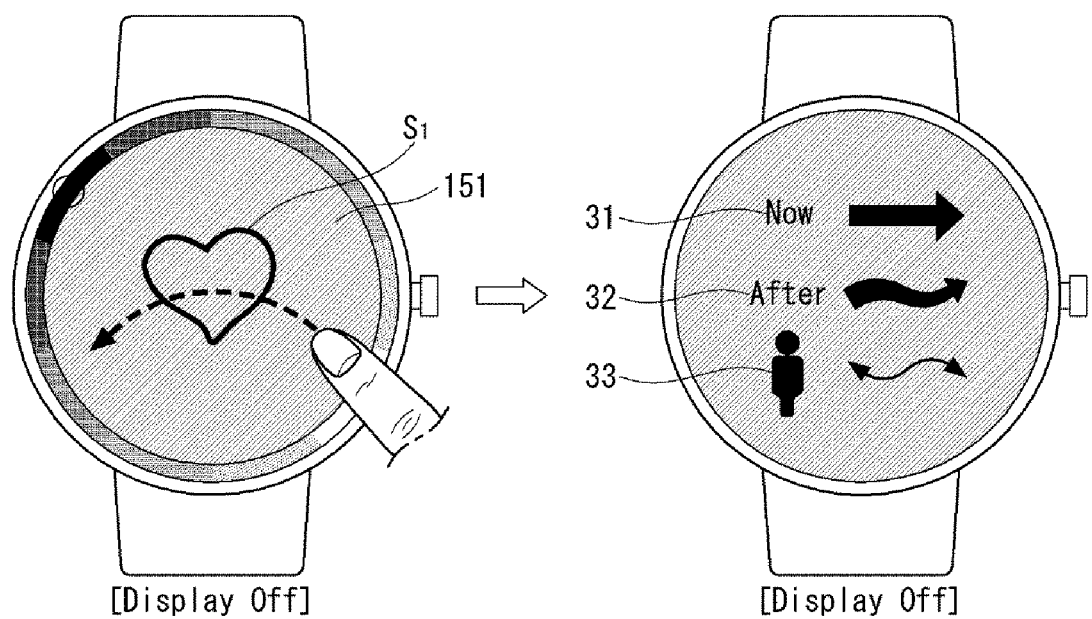

【Figure 7B】
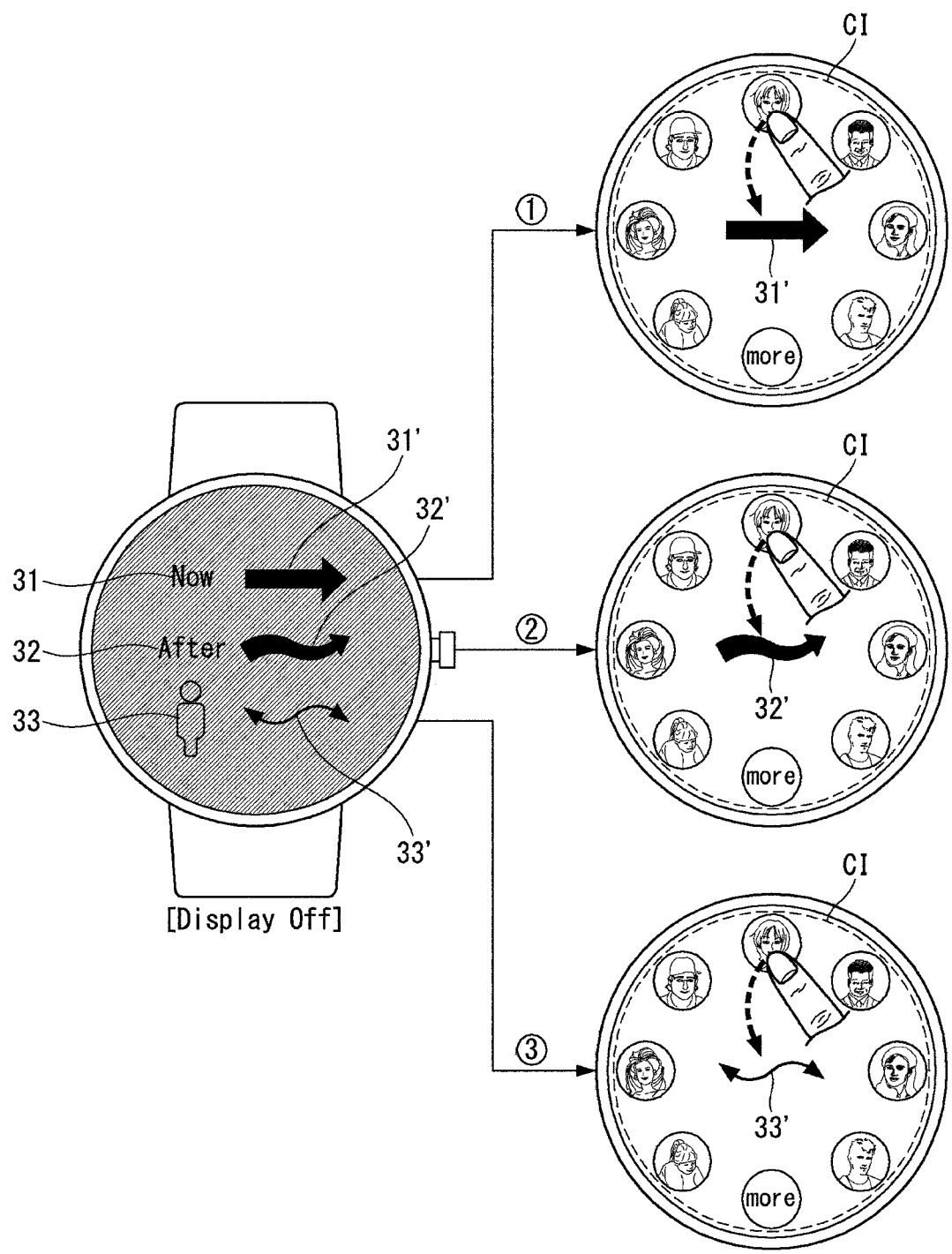

【Figure 8】
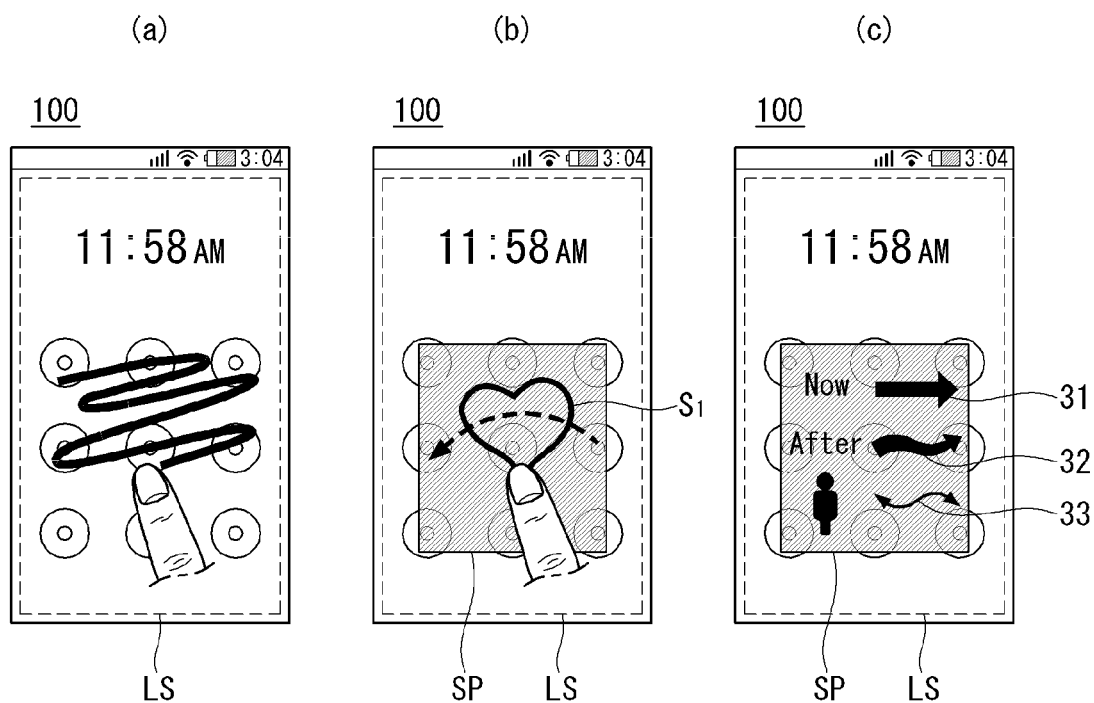

[Figure 9A]
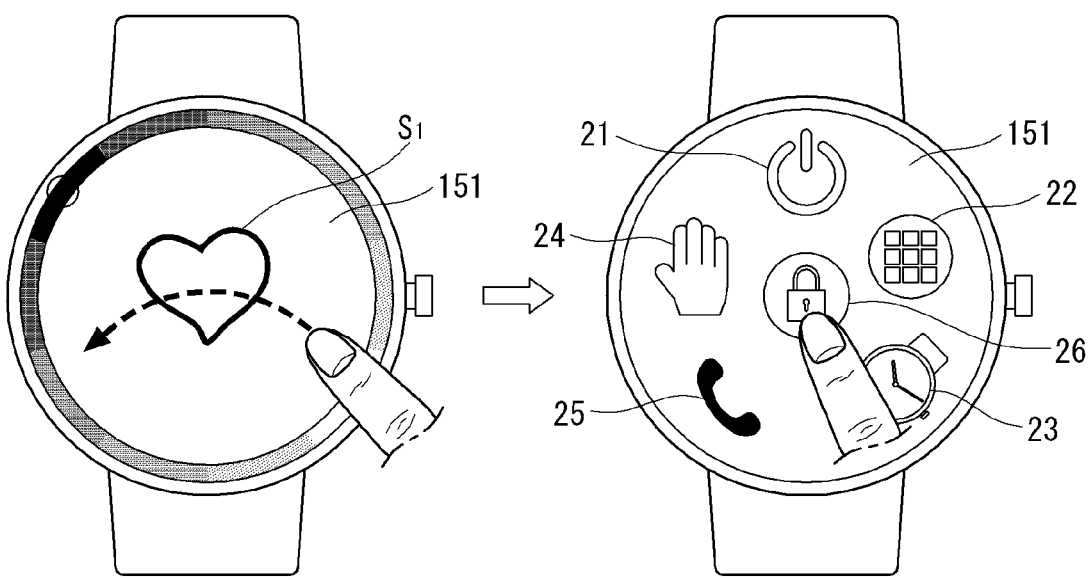

[Figure 9B]
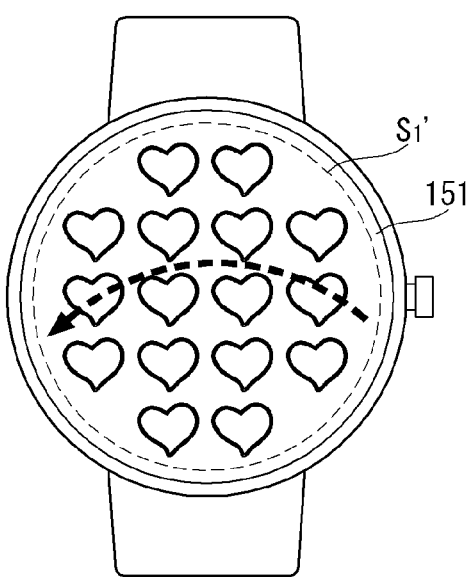

【Figure 9C】
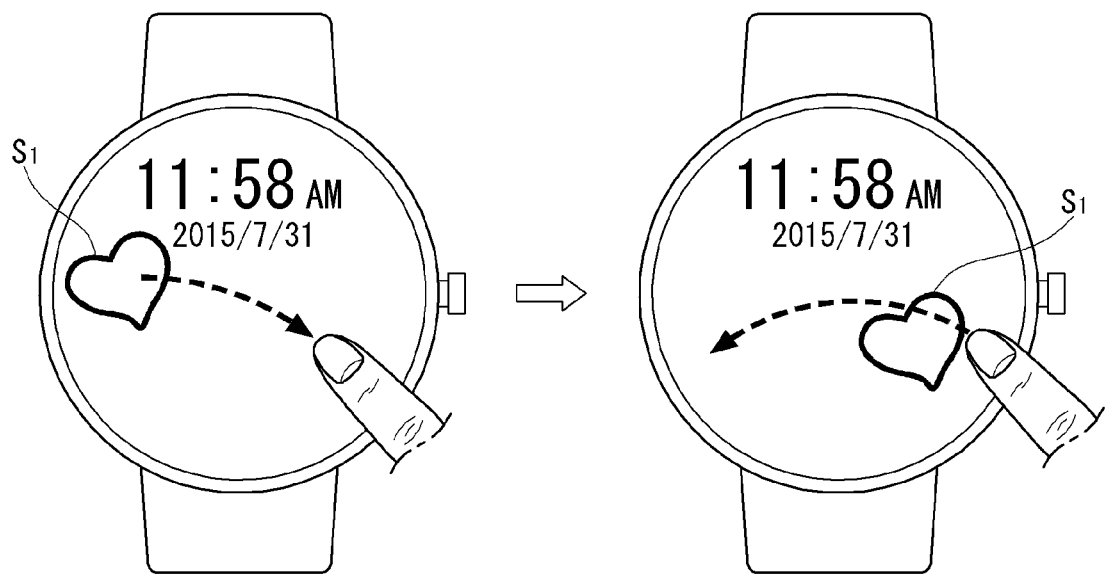

【Figure 10A】
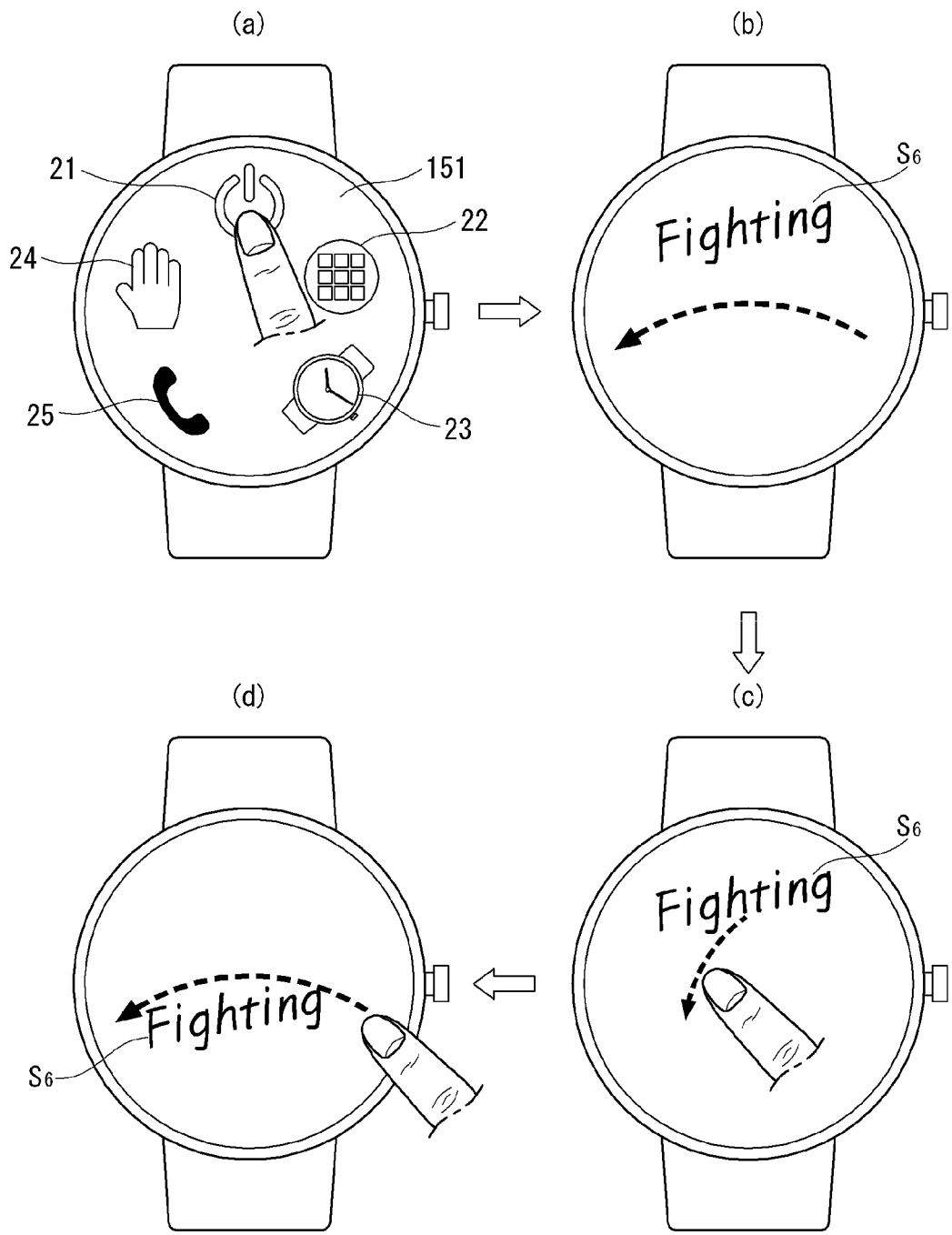

[Figure 10B]
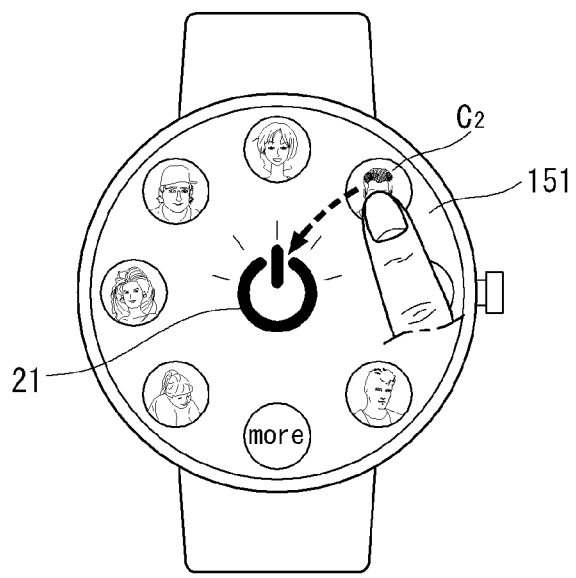

【Figure 11】
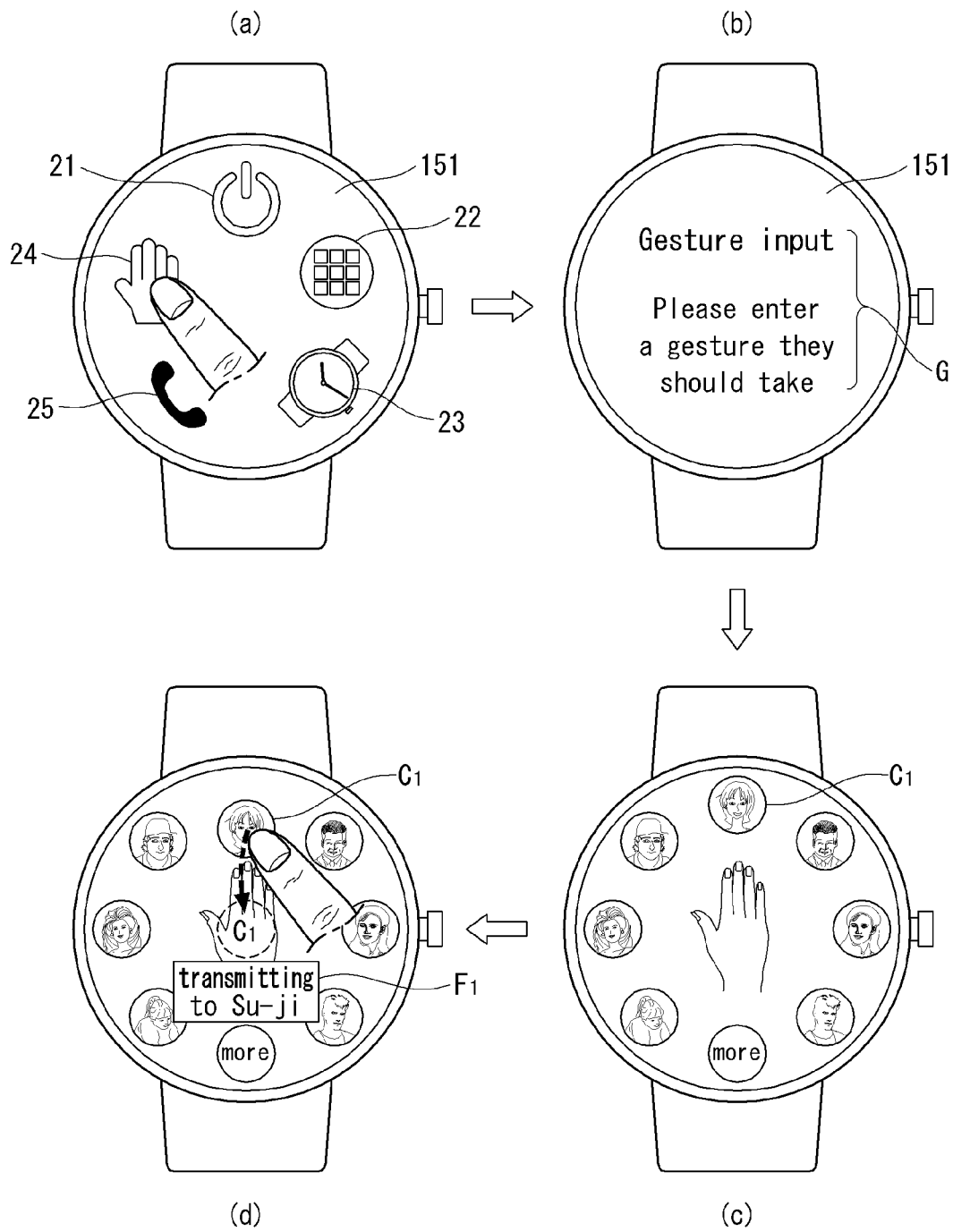

【Figure 12】
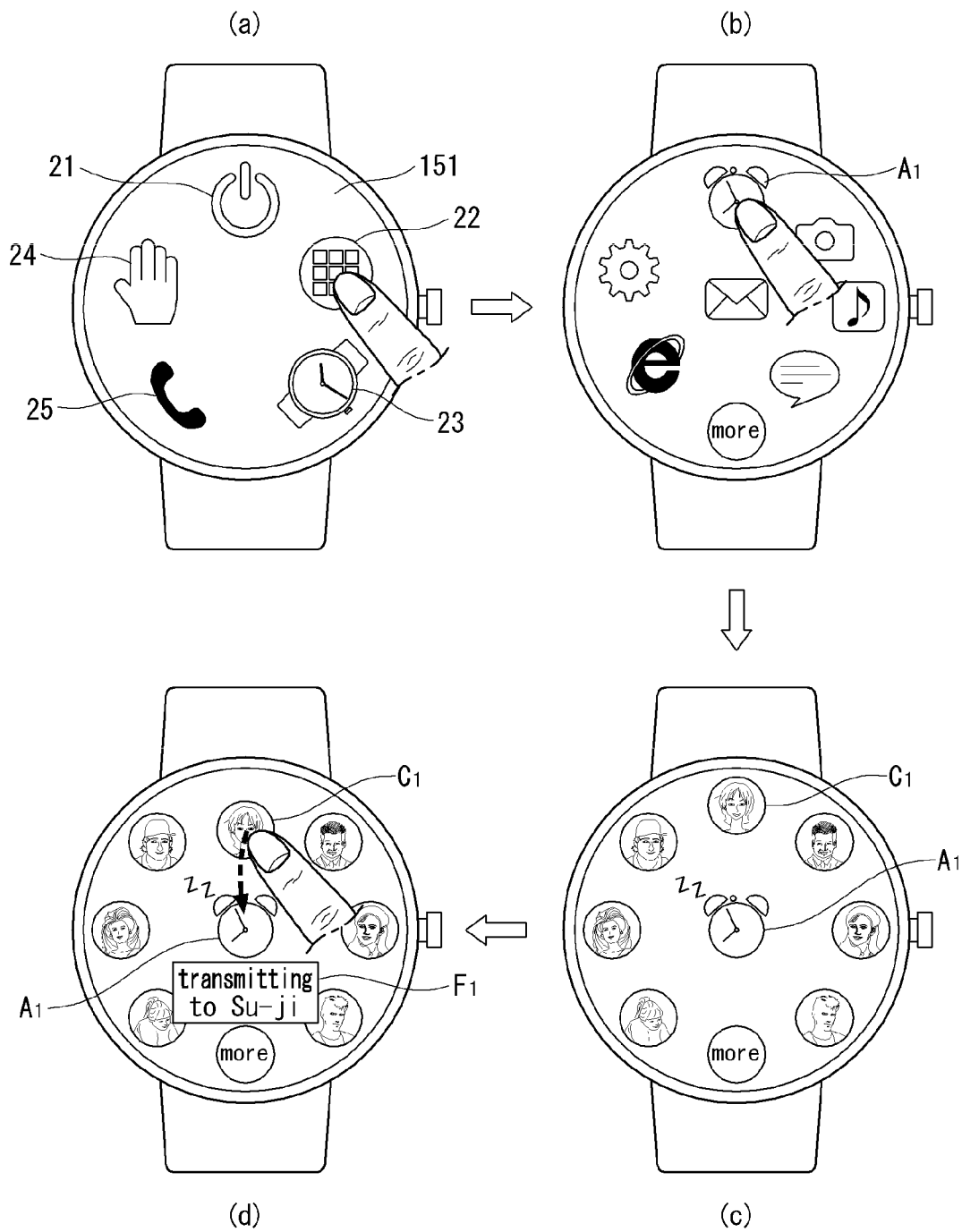

[Figure 13]
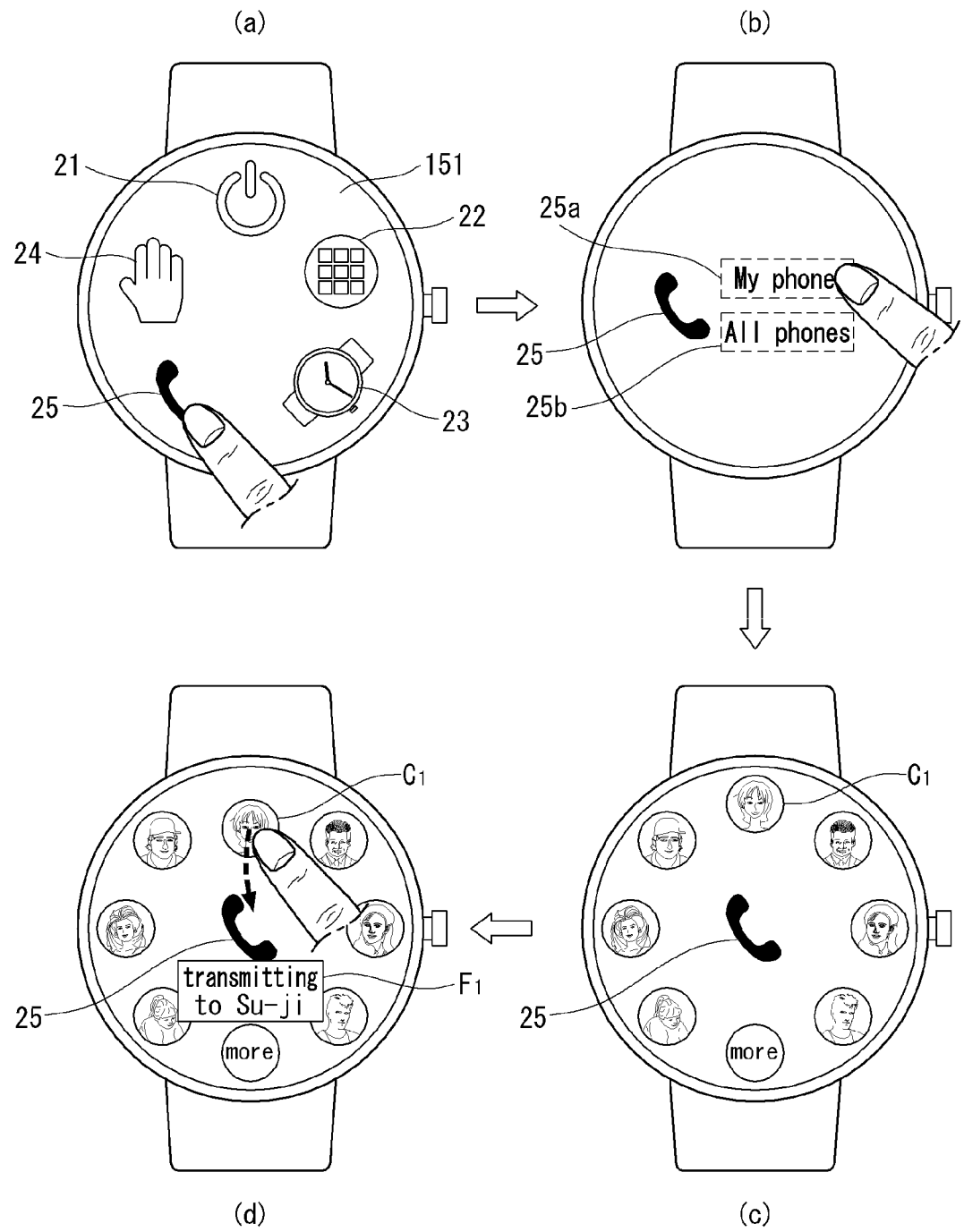

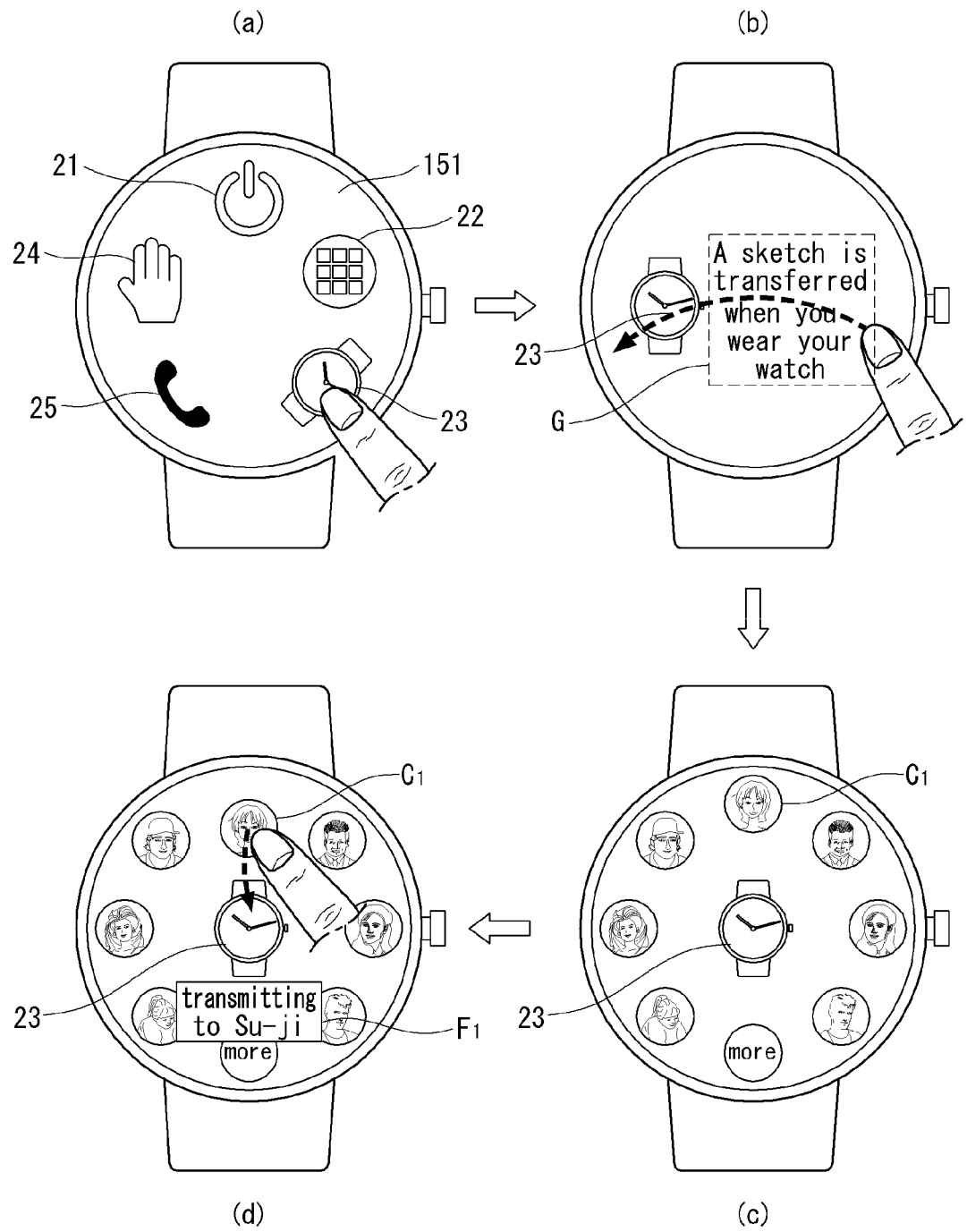
[Figure 14]

[Figure 15]
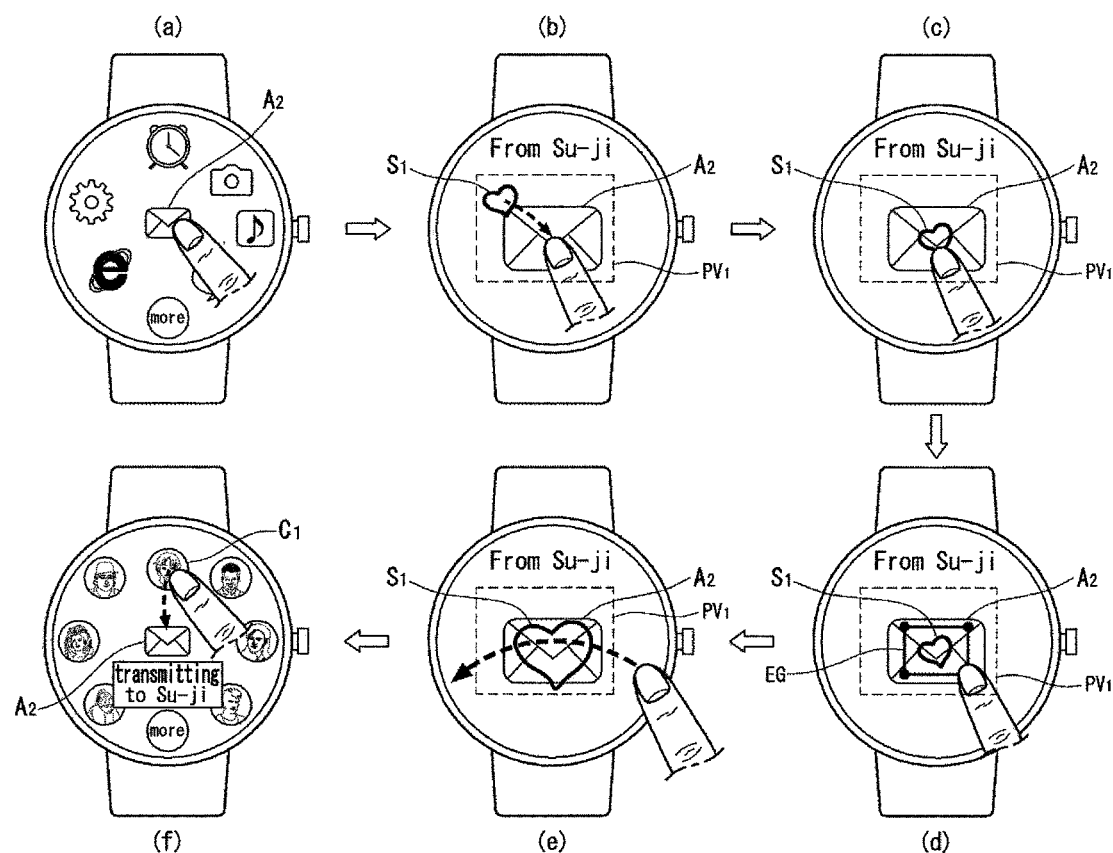

【Figure 16A】
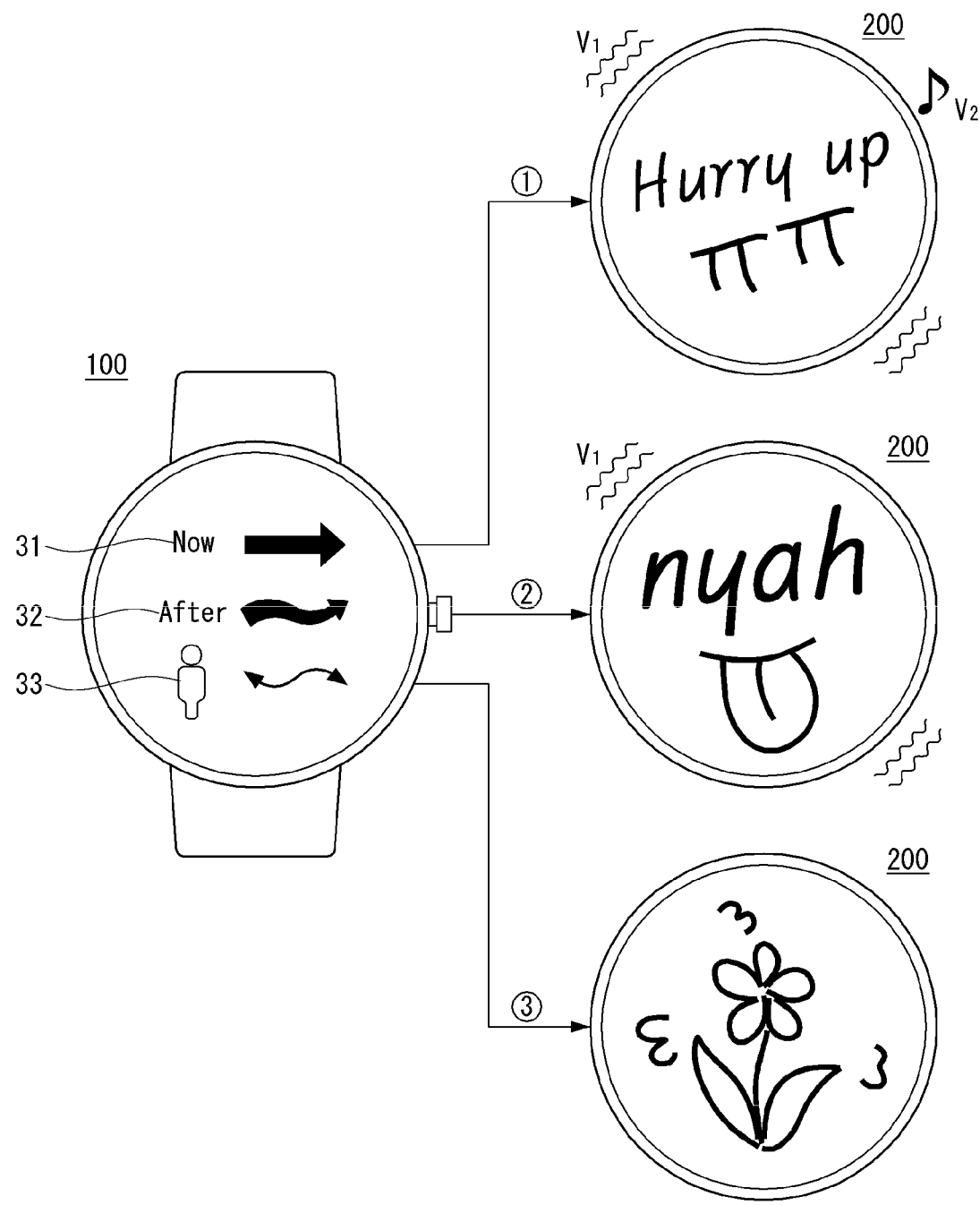

[Figure 16B]
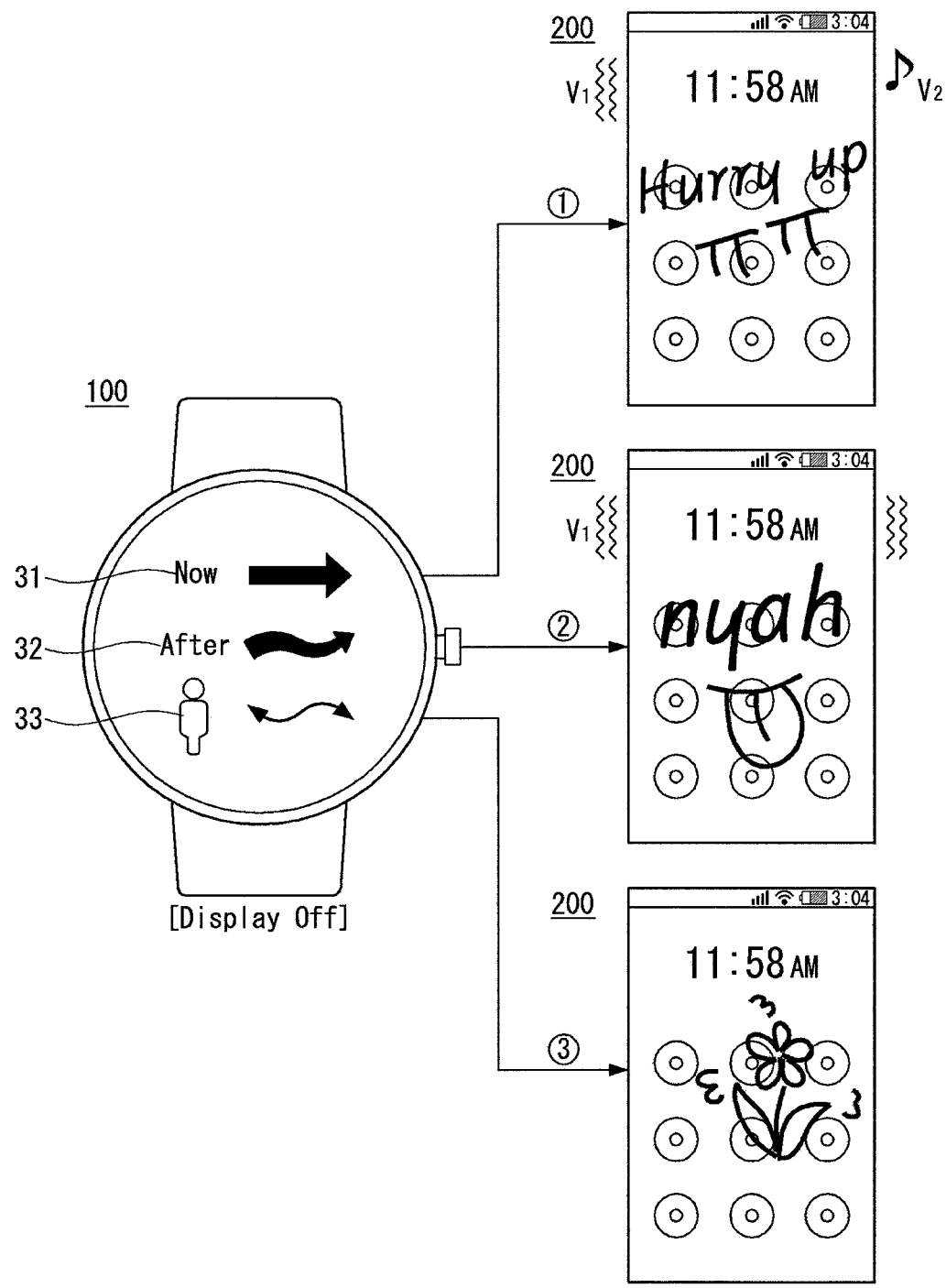

【Figure 17】
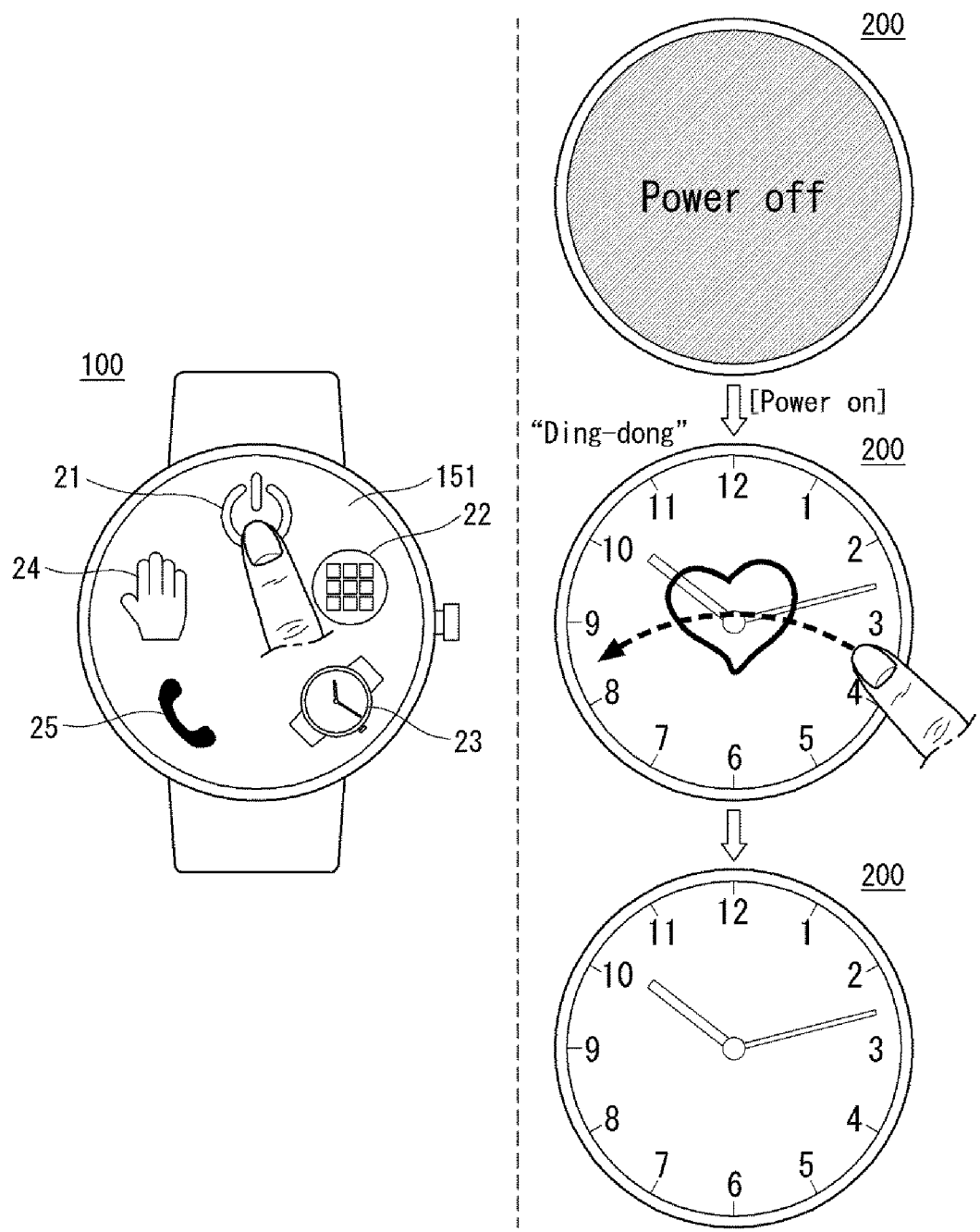

【Figure 18】
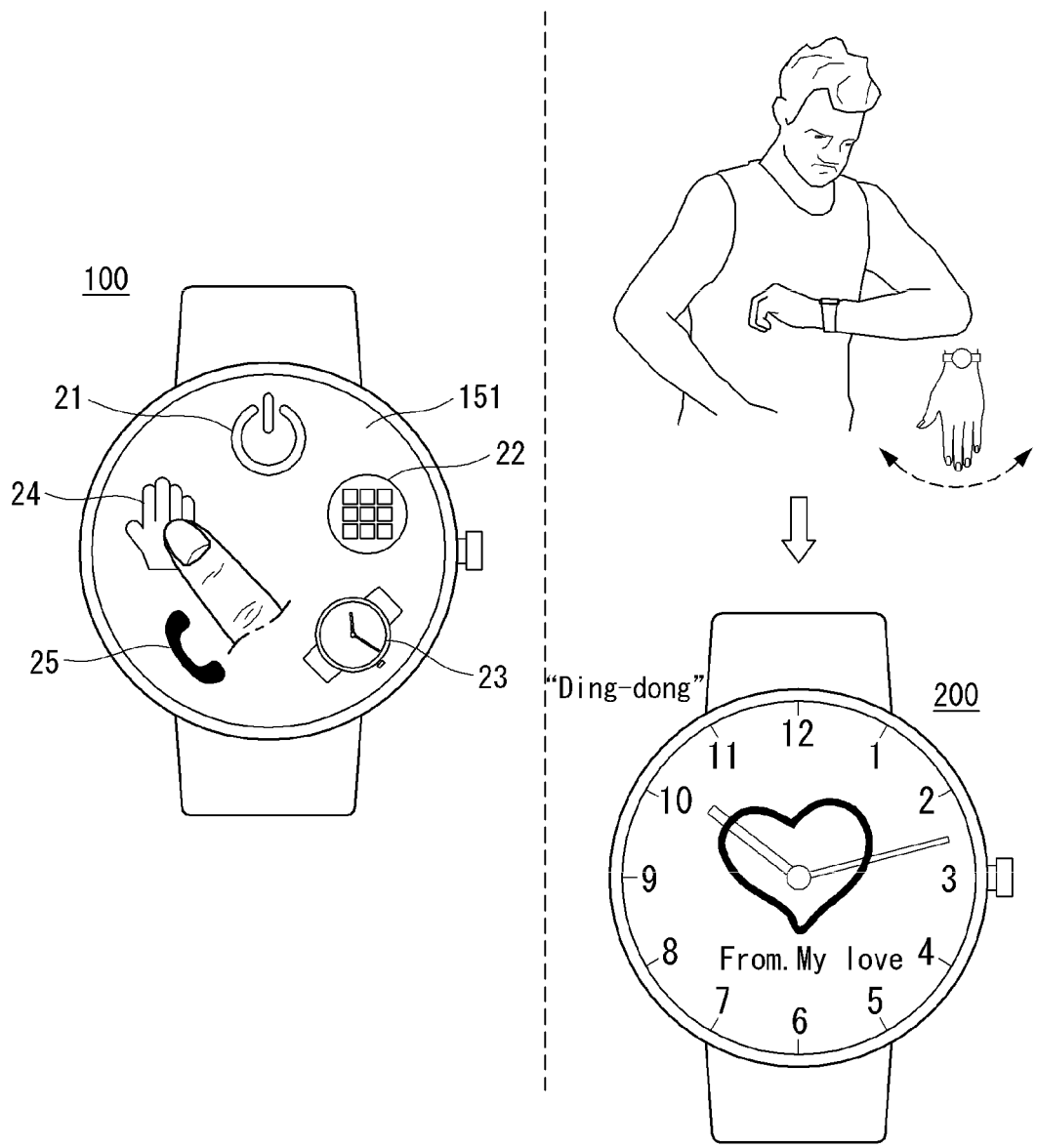

【Figure 19】
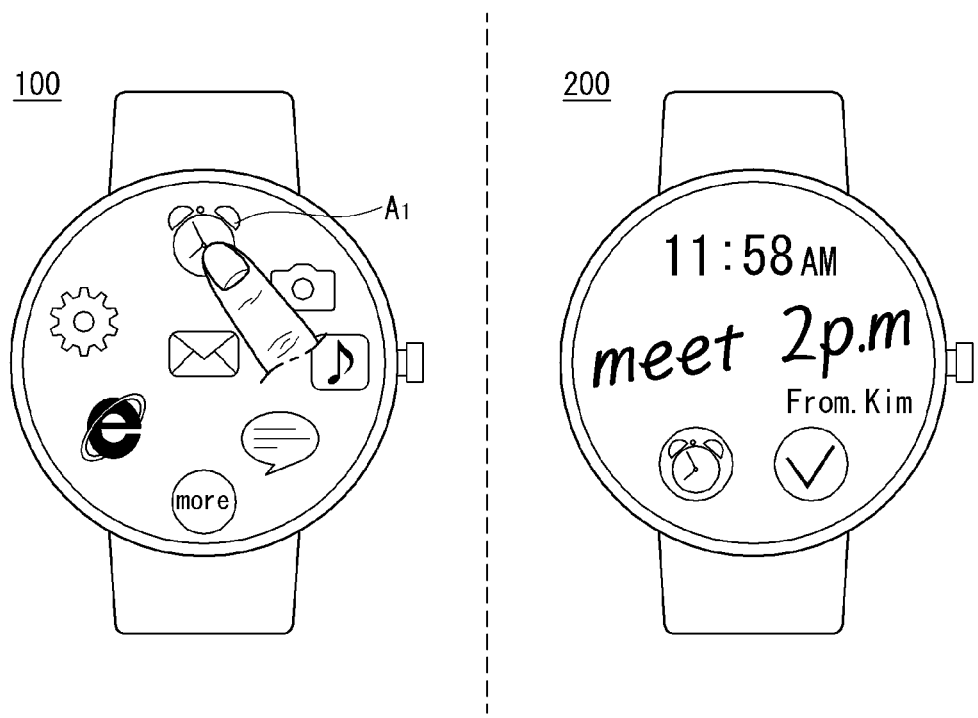

【Figure 20】
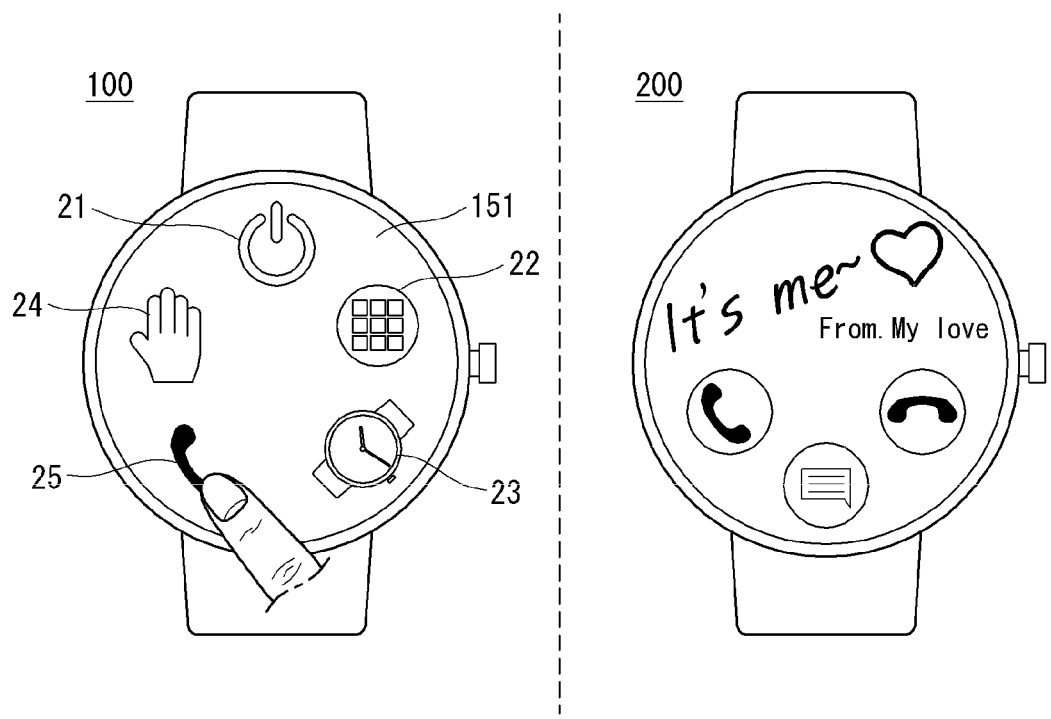

【Figure 21】
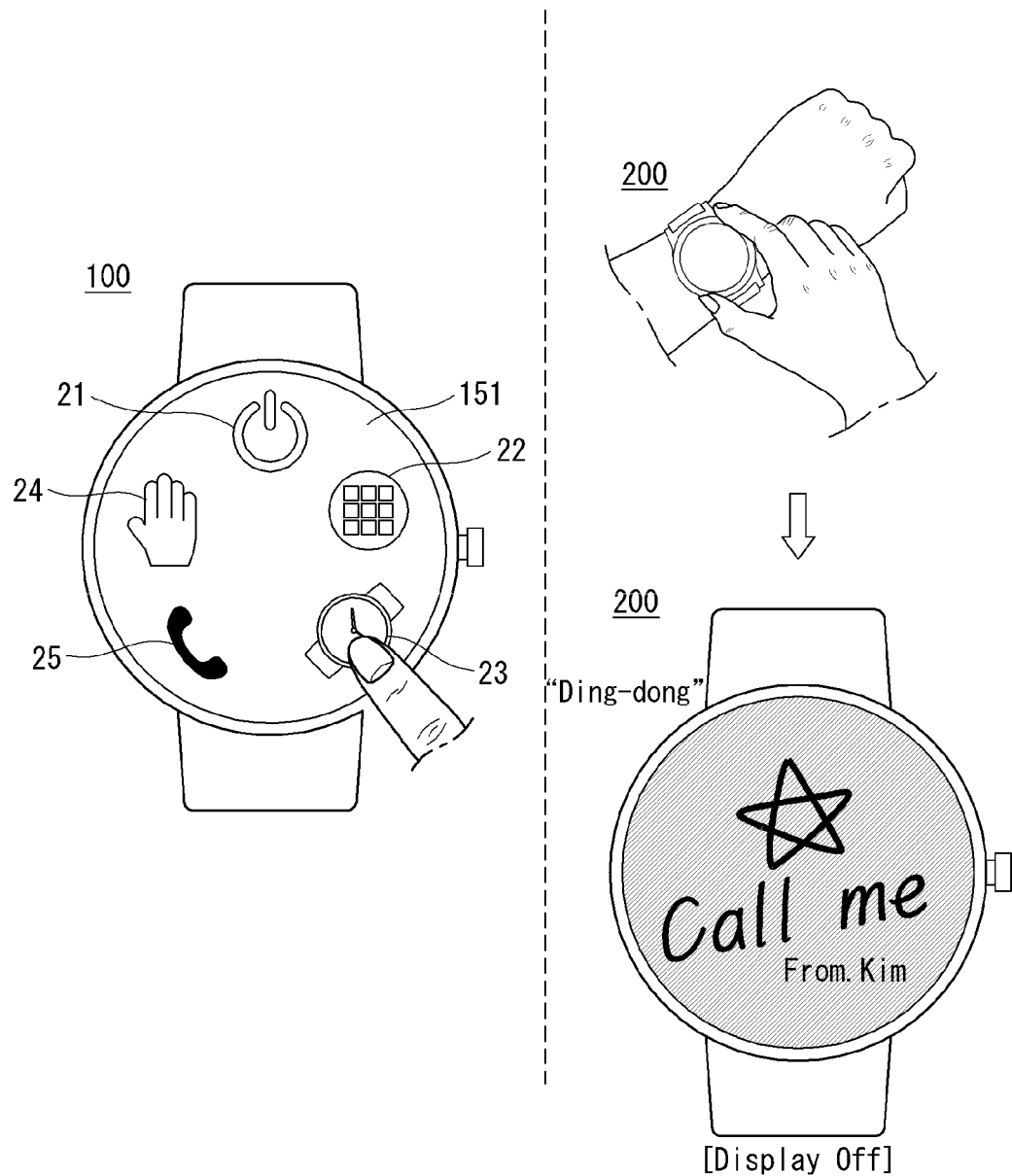

【Figure 22】
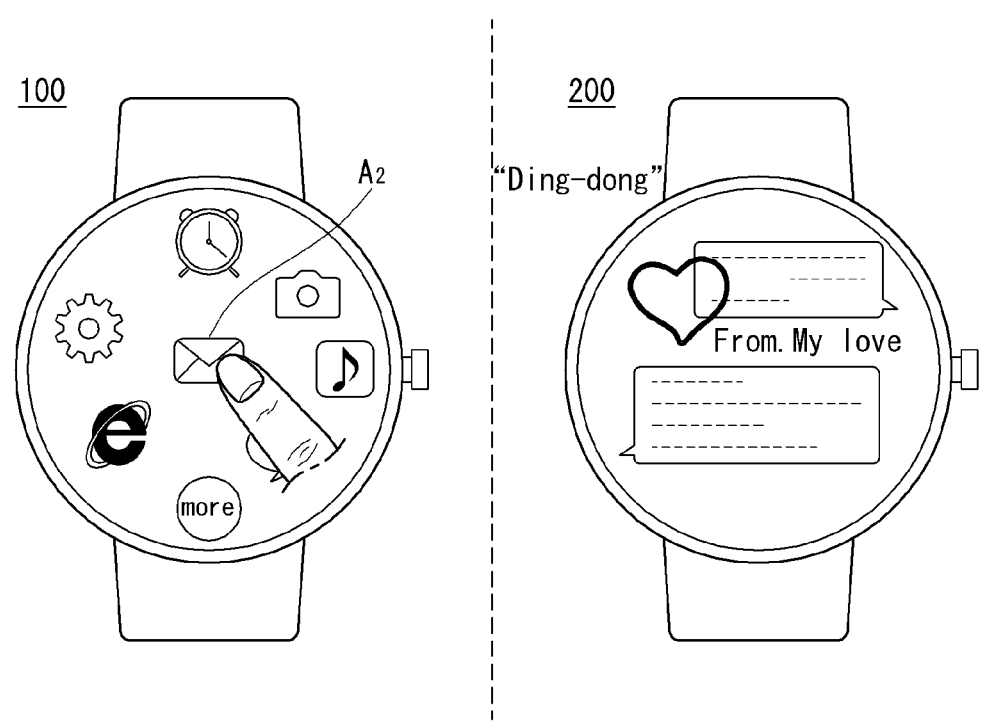

【Figure 23】
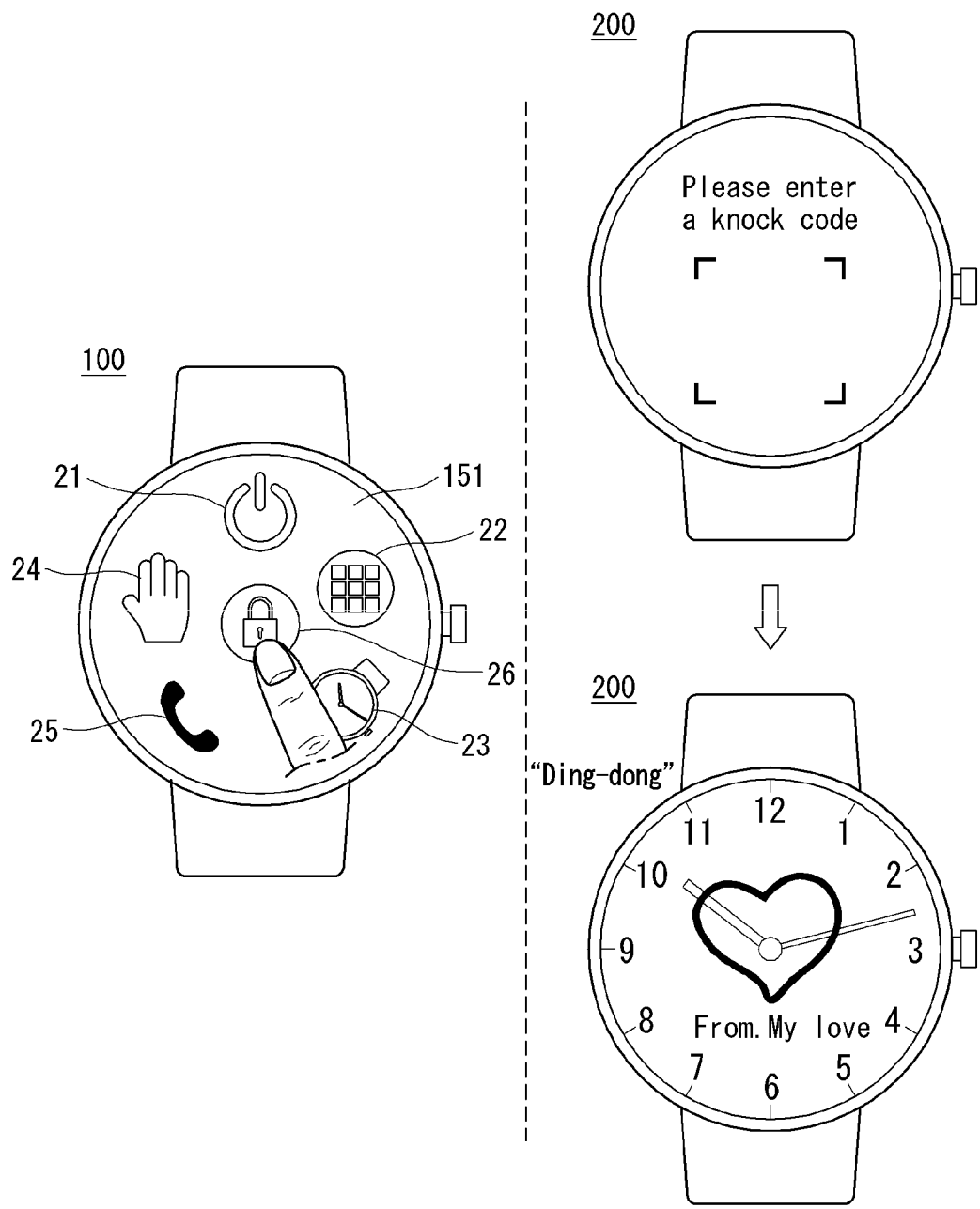

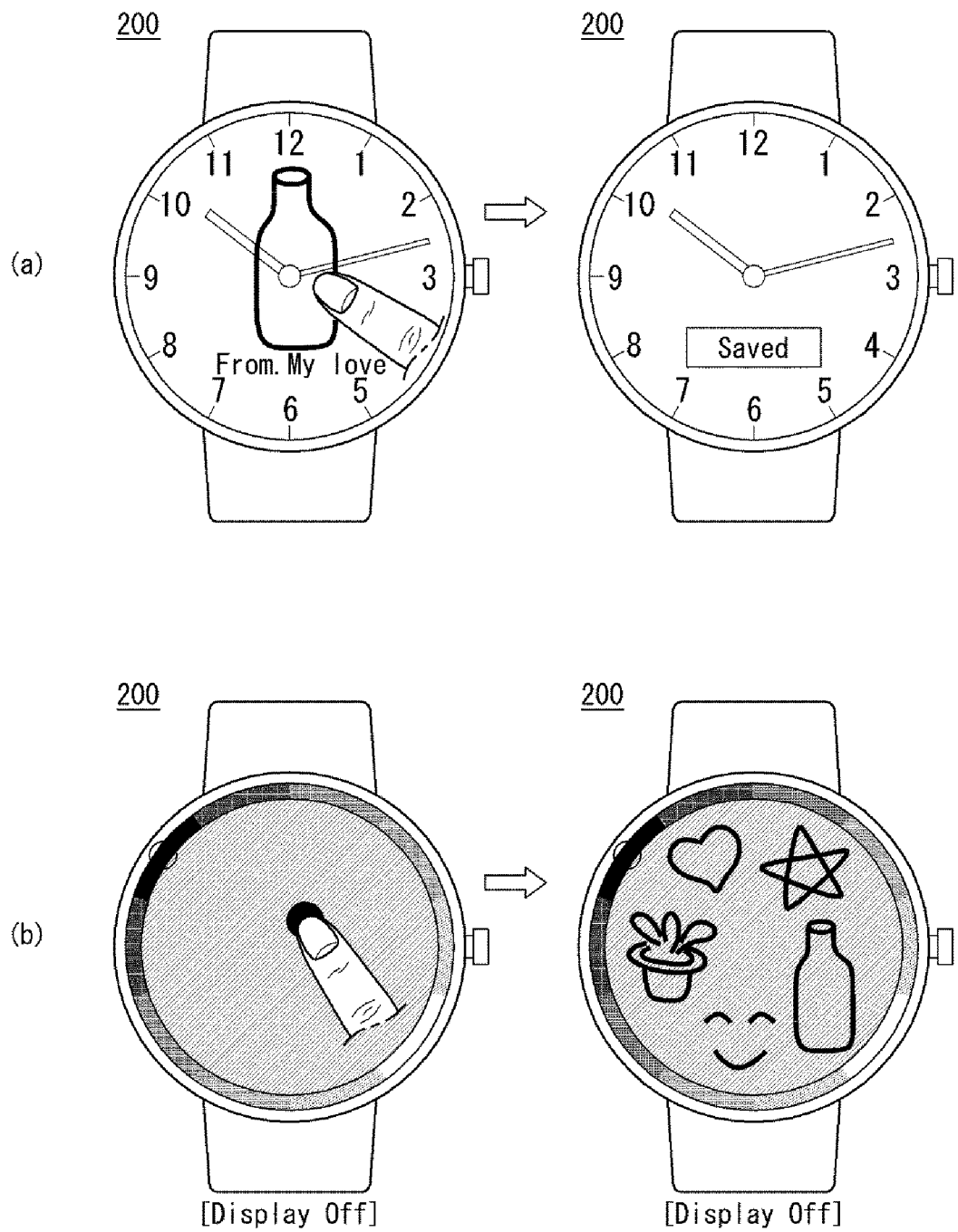
【Figure 24】

【Figure 25】
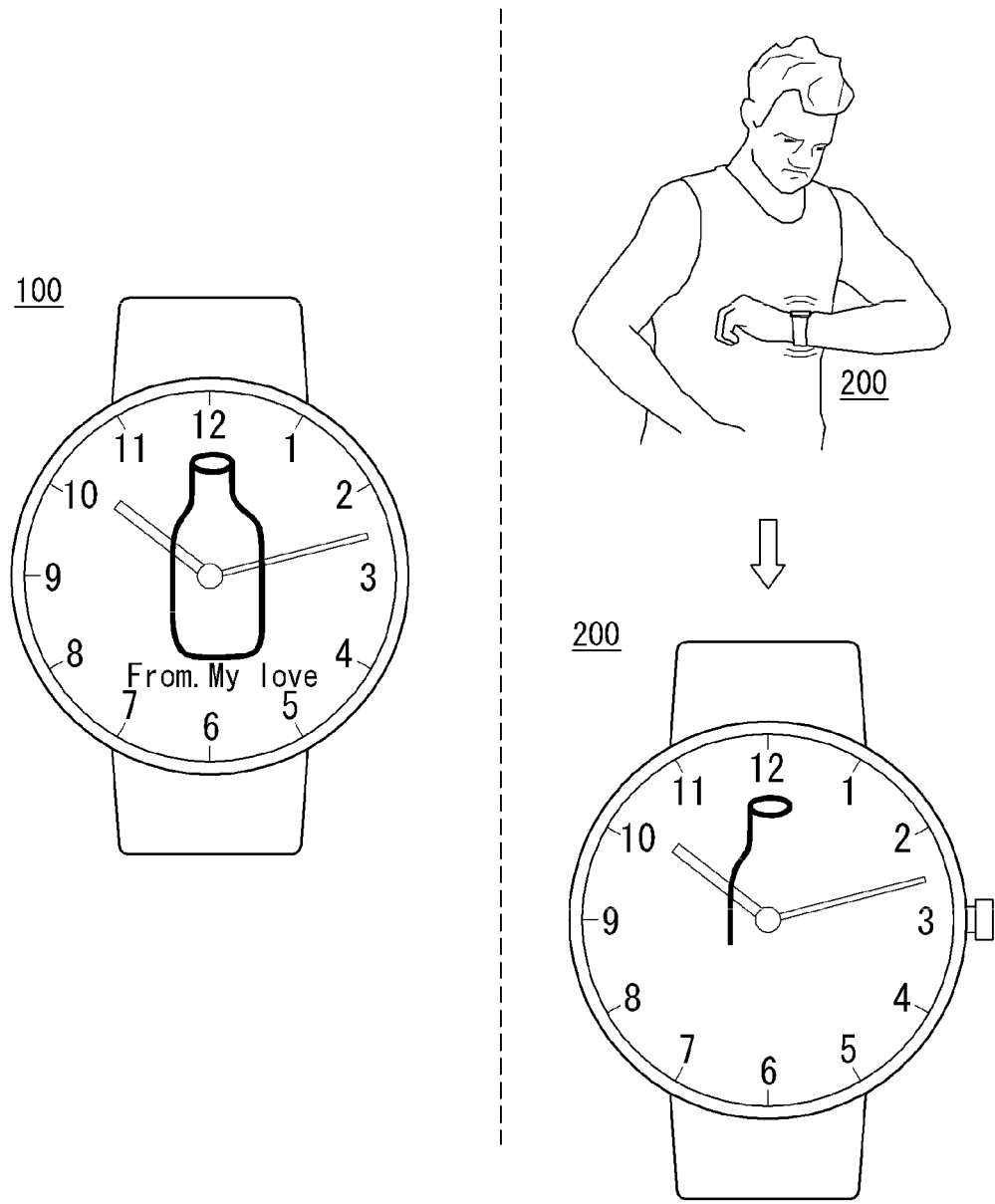

【Figure 26】
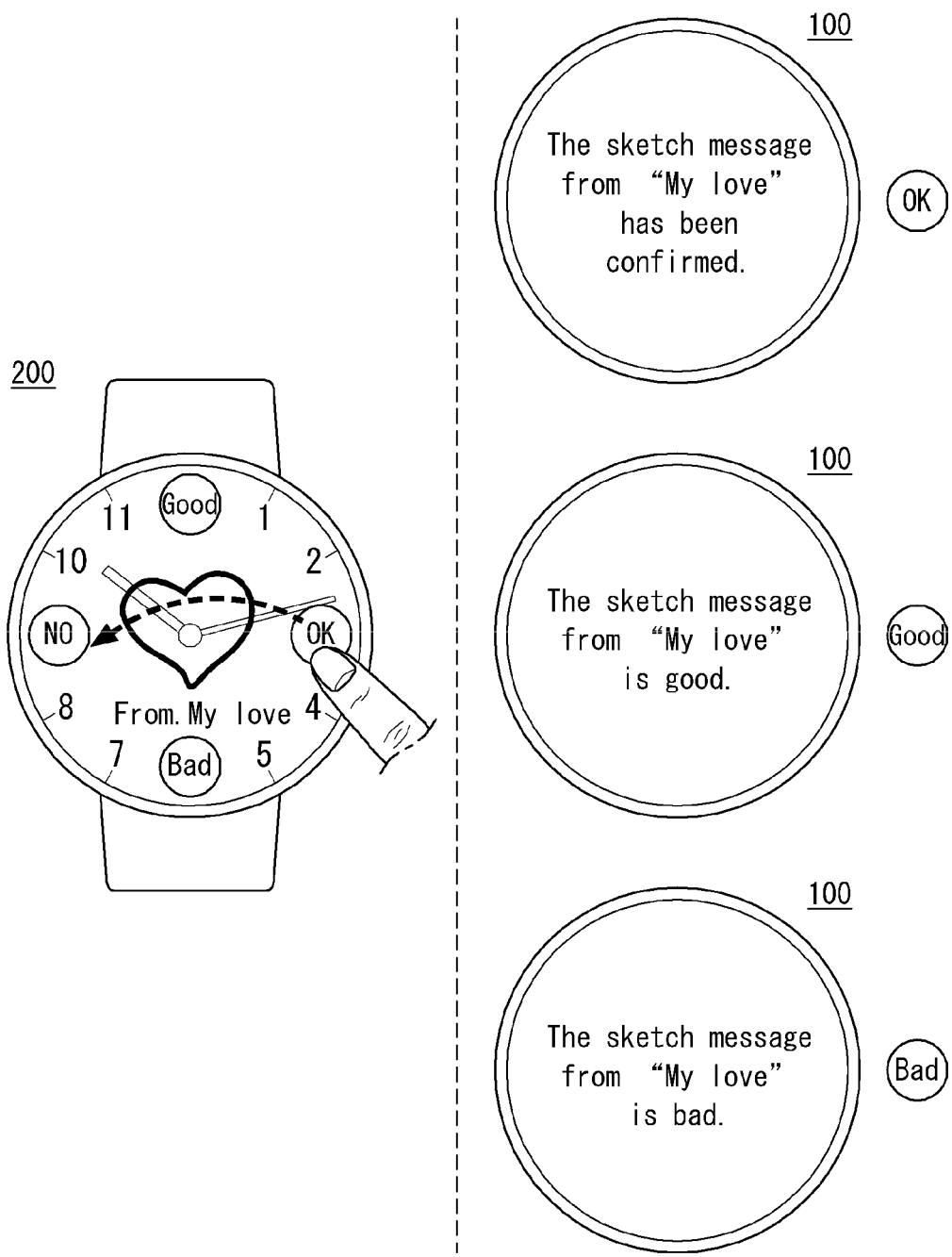

MOBILE TERMINAL AND CONTROL METHOD THEREOF

CROSS-REFERENCE TO RELATED APPLICATIONS

This application is the National Phase of PCT International Application No. PCT/KR2016/005473, filed on May 24, 2016, which claims priority under 35 U.S.C. 119(a) to Patent Application No. 10-2015-0112331, filed in the Republic of Korea on Aug. 10, 2015, all of which are hereby expressly incorporated by reference into the present application.

BACKGROUND

Field of the Invention

The present invention relates to a mobile terminal and control method thereof.

Discussion of the Background Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

On the other hand, research on wearable computing devices has recently become more and more active, and interest in how to use wearable computing devices is increasing. A wearable computing device can mean a piece of clothing, a watch, a pair of glasses, or any other computing device that a user can wear. While handheld terminals such as smart phones and tablet PCs have the advantage that they can be conveniently used with a finger or a stylus pen, there is the inconvenience that a user must carry or carry a handheld terminal in a pocket or bag. In contrast, since the wearable computing device can be worn on the wrist or worn like glasses, the portable device can be made more portable than the conventional portable terminal.

On the other hand, there is a need to apply a simpler method or a completely new method in case of attempting communication (conversation) with them using the wearable computing device.

SUMMARY OF THE INVENTION

An object of the present invention is to provide a mobile terminal that provide a user interface that enables easy and efficient control of a mobile terminal (watch-type mobile terminal) and a method for controlling the same.

Another object of the present invention is to provide a mobile terminal that a sender sets a message reception time after a message is created, and transmits the message to a receiver and a method for controlling the same.

Another object of the present invention is to provide a mobile terminal that implements a new message transfer method by receiving a message of a sender in a specific situation via an unintended environment (an action, an event) of a receiver at a reception time set by the sender and a method for controlling the same.

Another object of the present invention is to provide a mobile terminal capable of transmitting a range of a conversation pattern through the mobile terminal by transmitting a message containing the emotion of the user as a new approach without passing through a conventional message creation screen and s method for controlling the same.

Technical ideas devised by the present invention are not limited to those described above and any other technical ideas not mentioned could be clearly understood by a person skilled in the art to which the present invention pertains from the following description.

According to an aspect of the present invention, a mobile terminal may include a communication unit, a touch screen; and a controller configured to provide a drawing pad on the touch screen in response to a predetermined input, transmit a message including a drawing created on the drawing pad, via the communication unit, to a reception side terminal, provide a user interface on the touch screen to set a time at which the message is received at the reception side terminal and transmit a control signal, via the communication unit, to display the message on a screen of the reception side terminal at the time set in the user interface.

The mobile terminal may further include a body on which the touch screen is disposed.

The mobile terminal may includes a mobile terminal of a watch-type having a band connected to the body and configured to be worn on a wrist. The controller may be configured to provide a color picker on the drawing pad along a rim of the touch screen and create the drawing with the color selected using the color picker.

The controller may be configured to provide the drawing pad on the touch screen when a predetermined gesture is input on the touch screen in a lock mode or in a clock mode.

The predetermined gesture may comprise a scrub gesture input in an atypical pattern on the touch screen.

The user interface may include at least one object for setting a message reception time.

The reception time of the message may be related to an event occurring at the reception side terminal, the at least one object may include an object corresponding to at least one event generated in the reception side terminal, respectively and the controller may be configured to transmit a control signal, via the communication unit, to display the message on the screen of the reception side terminal at a time when an event corresponding to first object is generated in the reception side terminal, when the first object is selected from the at least one object.

The event may be an event that the reception side terminal is powered on.

The event may be an event that the gesture set in the user interface is detected in the reception side terminal.

The event may be an event in which the application set in the user interface is executed in the reception side terminal.

The event may be an event in which a call is received from a caller set in the user interface.

The event may be an event that the reception side terminal, which is a wearable device, is worn by a user.

The event may be a case where an unidentified communication history of a communication event received from the mobile terminal exceeds a predetermined number of times.

The controller may be configured to provide a screen configuration of the reception side terminal provided with the drawing as a preview on the touch screen, and edit at least one of a position and a size of the drawing to be displayed on the screen of the reception side terminal in response to a touch input.

The controller may be configured to receive a feedback message, via the communication unit, from the reception side terminal when the message is checked at the reception side terminal.

The controller may be configured to transmit a file recorded with a creation process of the drawing on the drawing pad, via the communication unit, to the reception side terminal together with the message.

The controller may be configured to display at least one contact object on the touch screen.

The controller may be configured to display the drawing on the screen of the reception terminal at a time when a first event occurs at the reception side terminal corresponding to first contact object when receiving an input associating the first contact object with the first event object.

According to another aspect of the present invention, a mobile terminal may comprise a communication unit, a touch screen and a controller configured to receive a message including a drawing from a transmission side terminal via the communication unit and display the drawing on the touch screen, and display the drawing included in the received message on the touch screen when an event set in the transmission side terminal is detected.

The event set in the transmission side terminal may comprise at least one of a first event in which the mobile terminal is powered on, a second event in which the mobile terminal detects a gesture set in the transmission side terminal, a third event in which the application set in the transmission side terminal is executed in the mobile terminal, a fourth event in which a call is received from a caller set at the transmission side terminal, and a fifth event in which an wearable device is worn by a user when the mobile terminal is the wearable device.

The mobile terminal may further include at least one of an audio output module, a haptic module and an optical output module. The controller may be configured to output at least one of a predetermined sound via the audio output module when the drawing is displayed on the touch screen, a predetermined vibration pattern via the haptic module and a predetermined optical signal via the optical output module.

According to another aspect of the present invention, a method for controlling a mobile terminal may comprise providing a drawing pad on a touch screen when a predetermined input is received; creating a message including a drawing via a touch input on the drawing pad; providing a user interface on the touch screen to set a time at which the message is received at a reception side terminal; and displaying the message on a screen of the reception side terminal at the time set via the user interface.

According to an embodiment of the present invention, the following effects can be obtained.

According to the present invention, a user interface for easily and efficiently controlling a mobile terminal (watch-type mobile terminal) can be provided.

Further, according to the present invention, a sender can create a message and then set a message reception time in advance and transfer it to a receiver.

Further, according to the present invention, a new message transfer method can be implemented by receiving a message of a sender in a specific situation via an unintended environment (action, event) of a receiver at a reception time set by the sender.

Further, according to the present invention, the range of the conversation pattern via the mobile terminal can be diversified by transmitting a message containing the emotion of the user as a new approach without using the conventional message creation screen.

BRIEF DESCRIPTION OF THE DRAWINGS

FIG. 1A is a block diagram of a mobile terminal in accordance with the present disclosure.

FIGS. 1B and 1C are conceptual views of one example of the mobile terminal, viewed from different directions.

FIG. 1D is a perspective view illustrating one example of a watch-type mobile terminal in accordance with another exemplary embodiment.

FIG. 2 is a schematic diagram of a system environment in which a control method of the mobile terminal according to the present invention is implemented.

FIG. 3 is a flowchart illustrating a method of controlling a mobile terminal according to an exemplary embodiment of the present invention.

FIG. 4 is a flowchart illustrating a method for controlling the mobile terminal according to the first embodiment of the present invention.

FIGS. 5A and 5B are views for explaining an example of entering the sketch mode in the mobile terminal according to the first embodiment of the present invention.

FIGS. 6A and 6B are views illustrating an example of providing a sketch to be transmitted according to the first embodiment of the present invention.

FIGS. 7A to 8 are views illustrating an example of setting a time at which the drawing generated at the mobile terminal is received at the reception side terminal.

FIGS. 9A to 9C are views illustrating an example of setting a time at which a message generated in a mobile terminal is received at a reception side terminal according to a first embodiment of the present invention, in connection with the status of the reception side terminal.

FIGS. 10A to 15 are views for explaining other examples in which the sketch generated according to a first embodiment of the present invention is received in the reception side terminal, in association with the status of the reception side terminal.

FIGS. 16A and 16B is a view for explaining an example in which the user of the mobile terminal sets the reception time differently according to the drawing to be transmitted according to the first embodiment of the present invention.

FIGS. 17 to 23 are views illustrating an example in which a message created according to the first embodiment of the present invention is displayed on a reception side terminal.

FIG. 24 is a view for explaining a process of storing a sketch generated according to the first embodiment of the present invention in the reception side terminal.

FIG. 25 is a view for explaining an example of displaying a creation process of a sketch according to the first embodiment of the present invention at a reception side terminal.

FIG. 26 is a view illustrating an example of receiving feedback when a sketch created according to the first embodiment of the present invention is checked at the reception side terminal.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1a according to the execution of an application program that have been stored in the memory 170. In addition, the controller 180 may operate at least two of the components included in the mobile terminal 100 in combination with each other for driving the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with each other to implement a method of operation, control, or control of a mobile terminal according to various embodiments described below. Also, the operation, control, or control method of the mobile terminal may be implemented on a mobile terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. Optionally, the location information module 115 may perform any of the other functions of the wireless communication unit 110 to obtain data regarding the location of the mobile terminal, in additional or replacement. The location information module 115 is a module used to obtain the location (or current location) of the mobile terminal, and is not limited to a module that directly calculates or obtains the location of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body can be understood to refer to at least one assembly of mobile terminals 100.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is provided with a display 151, first and second audio output modules 152a and 152b, a proximity sensor 141, an illumination sensor 142, an optical output module 154, First and second manipulation units 123a and 123b, a microphone 122, an interface unit 160 and First and second cameras 121a and 121b.

FIGS. 1B and 1C depict, the display 151, the first audio output module 152a, the proximity sensor 141, the illumination sensor 142, the optical output module 142, the second manipulation unit 123b, the microphone 122 and the interface unit 160 are disposed on a side surface of the terminal body, And the mobile terminal 100 in which the second audio output module 152b and the second camera 121b are disposed on the rear surface of the body will be described as an example.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display 151 displays (outputs) the information processed by the mobile terminal 100. For example, the display 151 may display execution screen information of an application program driven by the mobile terminal 100 or UI (User interface) and GUI (Graphic User Interface) information according to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

FIG. 1D is a perspective view illustrating one example of a watch-type mobile terminal 300 in accordance with another exemplary embodiment.

As illustrated in FIG. 1D, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

FIG. 2 is a schematic diagram of a system environment in which a control method of the mobile terminal according to the present invention is implemented.

Referring to FIG. 2, a personal wireless environment 10 in which a watch type mobile terminal is operated may enable users of a plurality of electronic devices to use a watch type mobile terminal 100 for outputting specific information or inputting specific information.

The personal wireless environment 10 may be activated to allow users of the watch-type mobile terminal 100 to interact with the mobile phone 200, a portable computer 210, a desktop computer 220 and/or other devices 230 of the watch type. The interaction with the watch-type mobile terminal 100 may be wired or wireless. For convenience of the user, the watch-type mobile terminal 100 supports wireless interaction with at least one of the at least one external electronic device 200, 210, 220, 230 in the vicinity. Here, the watch-type mobile terminal 100 can use a piconet formed between nearby external electronic devices.

The mobile terminal 100 according to an embodiment of the present invention may perform data communication with external electronic devices 200, 210, 22, and 230. The data communication may include sending and receiving a text message.

Meanwhile, the mobile terminal 100 according to an embodiment of the present invention may perform a pairing with the external mobile terminal 200. When a predetermined event is generated in the external mobile terminal 200, the mobile terminal 100 may receive notifications for the event. The pairing may be performed through Bluetooth, Near Field Communication (NFC), or the like. That is, when the mobile terminal 100 and the external mobile terminal 200 are paired, the external mobile terminal 200 may receive a predetermined event from another external electronic device (for example, 210, 230, etc.). The mobile terminal 100 may receive the notification indicating the reception of the event.

Meanwhile, in one embodiment of the present invention, various examples of transmitting a message to the external electronic device via the smart watch 100 through a simpler method will be described.

FIG. 3 is a flowchart illustrating a method of controlling a mobile terminal according to an exemplary embodiment of the present invention.

Referring to FIG. 3, reference numeral 100 denotes a watch-type mobile terminal 100, which performs data communication with the external electronic device 200. FIG. 2 illustrates an example in which the mobile terminal 100 and the external electronic device (external mobile terminal) 200 perform pairing so that both terminals operate in pairs. Hereinafter, it is assumed that the external electronic device (external mobile terminal) 200 is not paired with the mobile terminal 100.

Referring to FIG. 3, a watch-type mobile terminal 100 may receive a drawing input on the touch screen 151 (S10). The mobile terminal 100 may generate a message including the input drawing. The message may consist of only the input drawing, or the text may be added to the drawing to form a single message.

The message may be created by executing a message application. According to an exemplary embodiment of the present invention, after entering the drawing input mode through a predetermined gesture operation on the touch screen 151 without executing an separate application for generating the message, the drawing can be received in the drawing input mode. On the other hand, the input drawing may be converted through a known symbol and character recognition algorithm, or may be created as message as it is in the input drawing.

Meanwhile, the mobile terminal 100 according to an embodiment of the present invention can transmit a message including the drawing to the reception side terminal 200. The controller 180 may set the reception time at which the message is received to the reception side terminal 200 (S11). A specific description of the reception time at which the message is received will be described later.

Then, the controller 180 may select a receiver (S13), and may forward the created message to the reception side terminal 200 (S14).

Meanwhile, the reception side terminal 200 may receive the message transmitted from the mobile terminal 100. More specifically, if the reception time set by the mobile terminal 100 is satisfied (S21: YES), the reception side terminal 200 may receive the message (S22). The receiver side terminal 200 may display the drawing included in the received message on the display.

The mobile terminal 100 according to an exemplary embodiment of the present invention may set a first time after the drawing is input and transmit the message to the first reception side terminal 200. That is, when the message reception time is set at a certain time in the future, rather than at the current time, the created message is transmitted at present and the message is received at the reception side terminal 200. But, the drawing included in the received message may be displayed on the reception side terminal 200 at the certain time in the future.

The message reception time set in the mobile terminal 100 may be received by the reception side terminal 200 at a specific time in the concept of a time line, but the present invention is not limited thereto. For example, according to one embodiment of the present invention, the message reception time may be set to be determined by a predetermined event occurring on the reception side terminal 200. Also, for example, if the reception side terminal 200 is a wearable device, it may be determined based on whether or not the wearable device is worn. The setting of the reception time will be described in detail with reference to FIGS. 7-15.

FIG. 4 is a flowchart illustrating a method for controlling the mobile terminal according to the first embodiment of the present invention. The method for controlling the mobile terminal according to an embodiment of the present invention may be implemented in the mobile terminal 100 described with reference to FIGS. 1 to 2. Hereinafter, the method for controlling the mobile terminal according to an exemplary embodiment of the present invention and an operation of the mobile terminal 100 for implementing the method will be described in detail with reference to the accompanying drawings.

Referring to FIG. 4, the mobile terminal 100 includes a body, and a touch screen 151 may be disposed on a front surface of the body. The mobile terminal may further include a band connected to the body and configured to be worn on the user's wrist.

The control unit 180 may receive a predetermined gesture input in a state where power is supplied to the touch screen 151 (S30, S32), or receive a predetermined gesture input in a state where power is not supplied to the touch screen 151 (S31, S32).

The controller 180 may control the mobile terminal 100 to operate in the drawing mode when the predetermined gesture input is detected.

The mobile terminal 100 may enter the drawing mode by receiving a predetermined gesture with respect to the touch screen 151 in the lock mode. The lock mode may be a state in which power is supplied to the display but a predetermined lock pattern is set and the lock state is not released. On the other hand, the lock mode may be a state in which no information is displayed because no power is supplied to the display.

Also, the mobile terminal 100 may enter the drawing mode by receiving a predetermined gesture input to the touch screen 151 in a clock mode (S33).

The clock mode is a mode that can be used to implement the clock function of the mobile terminal 100. In the clock mode, a touch input other than the predetermined pattern input for entering the drawing mode may be not recognized. Meanwhile, the mobile terminal 100 may provide a home screen mode other than the clock mode through user input. In the home screen mode, icons of at least one application executable in the mobile terminal 100 may be arranged and displayed. In the home screen mode, even if the predetermined gesture input is received, the user may not enter the drawing mode.

The predetermined input may include a scrub gesture input on the touch screen 151 in an atypical pattern. The scrub gesture input in the atypical pattern may be a gesture for the user to scrub the touch screen 151 with a finger. The scrubbing direction may not be determined, and may not be a pattern in which a certain figure must be formed due to the scrubbing gesture. That is, the user may unconsciously scrub the touch screen 151 to control the mobile terminal 100 to operate in the drawing mode.

The controller 180 may provide the drawing pad to the touch screen 151 in the drawing mode (S35). The drawing pad may be provided to have a predetermined shape or color so as to be recognized by the user's eyes. However, according to an embodiment of the present invention, the drawing pad may be provided to maintain the same state as that of the touch screen 151 before the predetermined gesture for entering the drawing mode is input.

Therefore, in state that the power of the touch screen 151 is turned off before entering the drawing mode, the controller 180 may control the touch screen 151 to function as the drawing pad. Further, for example, when switching from the clock mode to the drawing mode, the controller 180 may control the screen itself displayed on the touch screen 151 in the clock mode to function as the drawing pad.

The controller 180 may receive the drawing input through the drawing pad and complete the drawing input (S40).

The drawing input may be input via a user's finger or by a stylus pen. The controller 180 may determine whether the drawing is completed when receiving a predetermined flicking input to the drawing pad after the drawing forming a predetermined contour is input via the drawing pad.

The controller 180 may set a time at which the message including the completed drawing is transmitted after the drawing is completed (S50).

The time at which the message is transmitted may indicate the time at which the drawing is displayed on the display of the reception side terminal. Accordingly, the mobile terminal 100 may transmit the drawing to the reception side terminal immediately after completing the drawing, but the time at which the drawing is displayed on the reception side terminal may be the time set by the mobile terminal 100.

The controller 180 may determine whether the mobile terminal 100 satisfies a predetermined condition (S60). The predetermined condition may include a condition related to the message transfer time. That is, if the message transfer time set in the mobile terminal 100 is a condition that must be satisfied in the mobile terminal 100, the message transfer is temporarily hold off, and the message may be transferred after that the predetermined condition is satisfied. (S70).

However, if the set message transfer time is not the condition that must be satisfied in the mobile terminal 100 but the condition that must be satisfied on the reception side terminal, the step S60 may be unnecessary.

FIGS. 5A and 5B are views for explaining an example of entering the sketch mode in the mobile terminal according to the first embodiment of the present invention.

Referring to FIG. 5A, the mobile terminal 100 may be power off the display 151. The controller 180 may receive a predetermined gesture P1 on the display 151*a* with no power, and the predetermined gesture may be the scrub gesture. In addition, the controller 180 may receive a predetermined gesture P2 on the display 151*b* while the mobile terminal 100 is in the clock mode.

Referring to FIG. 5B, the controller 180 may control the mobile terminal 100 to operate in the drawing mode as the scrub gesture is input, and control the display 151 to be available as the drawing pad. Meanwhile, the controller 180 may provide a color picker along the rim of the display 151 together with the drawing pad. When receiving the drawing input in a state in which a specific color among the color pickers is selected, the controller 180 may output the drawing S1 inputted with the selected color reflected on the drawing pad.

Meanwhile, according to an embodiment of the present invention, it may not provide any setting menus other than the color picker provided on the drawing pad. Since the watch-type mobile terminal 100 may have a limited display size, the size of the display may be small to perform both the input function and the display function. Accordingly, only a menu for selecting a drawing color along the border area of the display can be provided. The user can transmit an emotional message including the drawing to the reception side terminal via the color picker, in a simpler manner.

FIGS. 6A and 6B are views illustrating an example of providing a sketch to be transmitted according to the first embodiment of the present invention.

Referring to FIG. 6A, when receiving a predetermined long touch input on the drawing pad in a state where the drawing pad is provided, at least one drawing pattern S1, S2, S3, S4, and S5 may be provided on the touch screen 151.

It is possible to display only the selected drawing pattern S2 on the drawing pad by selecting the specific drawing pattern S2 among the at least one drawing pattern S1, S2, S3, S4, and S5. That is, the user may directly input a predetermined drawing on the drawing pad via a finger or a stylus pen, but may also search and select the drawing pattern to be transmitted as the message from the memory.

After the drawing is completed, the controller 180 may set a time at which the reception side terminal receives the message including the drawing.

The controller 180 may provide the user interface for setting the time at which the message is received at the reception side terminal on the touch screen 151. For example, when a touch input for flicking the drawing pad to the left is input after the predetermined drawing pattern S2 is selected in FIG. 6A, the controller may display the user interface for setting the message reception time as shown in FIG. 6B on the touch screen 151.

Referring to FIG. 6B, the user interface may include at least one object (graphic object) 21, 22, 23, 24, 25 for setting a time at which the message is received at the reception side terminal.

The graphic objects 21, 22, 23, 24, and 25 may be disposed on the touch screen 151 based on the external shape of the touch screen 151. As shown in FIG. 2, the display 151 of the watch-type mobile terminal 100 may have a rectangular shape or a circular shape. Accordingly, when the display 151 has the rectangular shape, the graphic objects may be arranged along the rectangular frame area. In addition, when the display 151 has circular shape, the graphic objects may be arranged along the circular rim. The arrangement of the graphic objects is not limited to the above, and may be variously changed as the shape of the display 151 is changed.

The message reception time of the reception side terminal according to an embodiment of the present invention may be related to an event occurring at the reception terminal. That is, the mobile terminal 100 can set the drawing to be displayed on the reception side terminal screen when a predetermined event occurs on the reception side terminal.

Therefore, the graphic objects 21, 22, 23, 24, and 25 shown in FIG. 6B may be objects corresponding to at least one event generated in the reception side terminal. For example, the first graphic object 21 is an object corresponding to a power on/off function, the second graphic object 22 is an object corresponding to a folder in which application icons are collected, the third graphic object 23 is an object corresponding to a smart watch, the fourth graphic object 24 is an object related to the user's gesture, and the fifth graphic object 25 is an object related to transmission and reception of a call. The controller 180 may set the message reception time of the reception side terminal using each of the graphic objects.

Meanwhile, according to the embodiment of the present invention, it may be set based on the receiving time at the mobile terminal 100, a status of the reception side terminal and a communication record of the mobile terminal 100 and the reception side terminal, not on the event generated on the reception side terminal 200.

Hereinafter, a process of setting the message reception time will be described in more detail with reference to FIGS. 7 to 15.

Meanwhile, a message used in this document is the message including the drawing.

FIGS. 7A to 8 are views illustrating an example of setting a time at which the drawing generated at the mobile terminal is received at the reception side terminal.

Referring to FIG. 7A, the controller 180 may receive a touch input for flicking the touch screen 151 from right to left in a state that the drawing S1 is completed on the drawing pad. The controller 180 may provide a user interface to the touch screen 151 for setting the message reception time of the reception side terminal. The user interface may include graphic objects (31, 32, 33) for setting the reception time.

The first graphic object 31 is an object mapped with a function of displaying the drawing included in the message on the reception side terminal screen at the same time as the message is transmitted.

The second graphic object 32 is an object mapped to the function of displaying the received message on the screen of the reception side terminal in the case that the screen of the reception side terminal is turned off for a predetermined time (for example, 30 minutes). For example, there may be the case where a predetermined message is transmitted from the mobile terminal 100 but the user of the reception side terminal does not view the screen. Accordingly, when the reception time is set through the second graphic object 32, a predetermined vibration may be output to the reception side terminal 200 and the message may be displayed on the screen.

The third graphic object 33 is an object mapped to the function of displaying the received message on the screen of the reception side terminal in the case of a predetermined number of unread communication records exist. For example, when there are three or more unchecked calls or messages transmitted from the mobile terminal 100, a predetermined vibration is output to the reception side terminal 200 and the message is output on the screen.

Meanwhile, the first graphic object to the third graphic object may be provided by combining predetermined graphics and texts, which can intuitively understand the function of each graphic object.

FIG. 7B is a view showing an example of selecting a recipient and setting the message reception time via the graphic object.

The control unit 180 may provide a separate contact interface (CI) for selecting the recipient. Generally, in the case of a mobile terminal, a list of scrollable phonebooks can be provided on the display, but the size of the display is small in a watch-type mobile terminal 100. Accordingly, the controller 180 may provide an object corresponding to at least one contact selected in accordance with a predetermined condition in the contact interface. The predetermined condition may be determined by a frequency of a call, a frequency of transmitting and receiving a message, or may be grouped according to a setting of a user. The contact interface (CI) may have a circular shape in the display shape of the watch-type mobile terminal 100.

When the first graphic object 31 or 31' is selected in the user interface for setting the message reception time, the controller 180 may display the first graphic object 31' at the center of the contact interface. When the first contact object included in the contact interface CI is dragged to the first graphic object 31', the controller 180 can immediately transmit the generated message to the reception side terminal corresponding to the first contact object, and display the received message on the display of the reception side terminal.

Further, when the second graphic object 32 or 32' is selected, the controller 180 may display the second graphic object 32' in the center of the contact interface CI. When the first contact object included in the contact interface is dragged to the second graphic object 32', the control unit 180 may transmit the generated message to the reception side terminal corresponding to the first contact object. When the state in which the screen of the reception side terminal is off for a predetermined time is maintained, the controller may display the received message on the display.

Further, when the third graphic object 33 or 33' is selected, the controller 180 may display the third graphic object 33' in the center of the contact interface CI. When the first contact object included in the contact interface is dragged to the third graphic object 33', the control unit 180 may transmit the generated message to the reception side terminal corresponding to the first contact object. When the message is not output to the reception side terminal immediately and unchecked communication records exist in the communication record with the mobile terminal 100 more than a predetermined number of times, the controller may display the received message on the display.

In addition, a mobile terminal 100 according to an embodiment of the present invention may include a bar type mobile terminal in addition to a watch-type mobile terminal, and FIG. 8 illustrates the bar type mobile terminal.

Referring to FIG. 8, the touch screen 151 may provide a lock screen LS in a locked mode. If the unlock pattern is not input on the lock screen and the predetermined gesture is input, the controller 180 may control the mobile terminal 100 to operate in the drawing mode. The drawing pad SP may be provided in the drawing mode, and the drawing may be input via the drawing pad SP. When the input for flicking from the right to the left of the drawing pad is received in the state where the drawing is completed, the user interface may be displayed overlaid on the lock screen LS. The user interface may include graphical objects (31, 32, 33) for setting a message reception timing at the receiving terminal. Meanwhile, when the message reception time is set, the controller 180 may provide the phone book list to the touch screen 151 at the same time of unlocking, even if no separate unlock pattern is input. That is, the mobile terminal 100 may be in a state in which the mobile terminal 100 has already been unlocked through an irregular scrubbing gesture input to enter the drawing mode on the lock screen in FIG. 8(*a*).

Also, the lock mode may be released as the message reception time is set through the user interface in a state where the lock mode is maintained.

FIGS. 9A to 9C are views illustrating an example of setting a time at which a message generated in a mobile terminal is received at a reception side terminal according to a first embodiment of the present invention, in connection with the status of the reception side terminal.

According to an embodiment of the present invention, when a message including a drawing is display on a screen of the reception side terminal, the mobile terminal 100 provides a function of setting an output pattern in the mobile terminal 100. That is, the controller 180 may set the message reception time and the screen configuration when the drawing is displayed at the reception side terminal.

Referring to 9A, the controller 180 may receive a predetermined touch input (a touch input for flicking the touch screen 151 from right to left) in a state that the drawing S1 is completed on the drawing pad. The controller 180 may provide a user interface on the touch screen 151 for setting the message reception time of the reception side terminal. The user interface may include at least one graphical object (21, 22, 23, 24, 25, 26) for setting a reception time point. Graphic objects corresponding to reference numerals 21 to 25 are as described in FIG. 6B. The sixth graphic object 26 corresponding to the reference numeral 26 is an object corresponding to the lock function. The sixth graphic object 26 is an object mapped with a function of displaying the message received from the mobile terminal 100 when the reception side terminal is in the lock mode.

When the sixth graphic object 26 is selected, the controller 180 may provide a preview of the transferred drawing on the lock screen of the reception side terminal.

Referring to FIGS. 9A and 9B, the preview is an example in which the generated drawing S1 is patterned and provided (S1') on the screen of reception side terminal. That is, the size of the drawing S1 generated by the user may be reduced, and the plurality of reduced drawings may be uniformly arranged in the entire area of the touch screen of the reception side terminal. In this state, when the user flicks the screen, the drawing pattern to be provided to the reception side terminal can be set.

Referring to FIG. 9C, the preview may include the drawing S1 displayed at a first location. The user can move the position of the drawing S1 from the first position to a second position through the touch input of the user on the preview screen. Then, when a gesture for turning the screen through the flicking input is input on the touch screen 151, the controller 180 can complete the process of setting the position where the drawing is displayed on the reception side terminal.

FIGS. 10A to 15 are views for explaining other examples in which the sketch generated according to a first embodiment of the present invention is received in the reception side terminal, in association with the status of the reception side terminal.

Referring to 10A, when an input for selecting the first graphic object 21 is received (A) in the user interface for setting the message reception time the drawing (S6) generated is provided on the touch screen 151 (B). Then, when receiving a flicking input for turning the screen on the touch screen 151, the user can enter a mode for editing the drawing. The mode in which the drawing can be edited may mean a mode in which the size, position, color, etc. of the drawing can be edited. And it may receive a drag input to move the drawing from the first position to the second position in the edit mode (C). When the editing is completed, the screen can be switched to a screen in which the recipient can be selected as the flicking input is received.

FIG. 10B illustrates a state in which a contact interface including a plurality of contact objects is provided, and the selected first graphic object 21 may be displayed at the center of the contact interface. When receiving an input for dragging a specific contact object C2 to the first graphic object 21, the controller 180 may transmit a message including the edited drawing to the reception side terminal corresponding to the specific contact object.

On the other hand, when the reception side terminal receives the message while the power is on, the drawing may not be displayed on the screen. When the power of the reception side terminal is switched from off to on, the drawing may be displayed on the screen.

Referring to FIG. 11, an input for selecting a fourth graphic object 24 in a user interface for setting a reception time of a message may be received (a). The fourth graphic object may be an object associated with the gesture input.

The controller 180 may provide the touch screen 151 with guide information G for setting a message reception time via the fourth graphic object 24 (b). The guide information G may be provided as a graphical object designating a text or gesture type that recommends gesture setting (or input).

In the case that a gesture to be taken at the reception side terminal is set, the controller 180 may display the fourth graphic object 24 in the contact interface (c).

Then, when receiving a drag input of the specific object C1 included in the contact interface toward the fourth graphic object 24, the controller 180 may transfer a message having the reception time set by the fourth graphic object to the reception side terminal corresponding to the specific object C1. Accordingly, the reception side terminal receiving the message may provide the drawing on the screen when the predetermined gesture is detected.

Referring to FIG. 12, an input for selecting a second graphic object 22 in a user interface for setting a message reception time may be received (FIG. 12(a)). The second graphic object 22 may include at least one icon each corresponding to at least one application. The at least one icon may correspond to a bookmarked application. Meanwhile, the controller 180 may further provide a button for adding another application icon to the touch screen 151. When an icon corresponding to the alarm function among the at least one icon is selected ((b) of FIG. 12), the controller 180 may display an icon corresponding to the alarm function in the contact interface ((c) of FIG. 12).

Then, when receiving a drag input of the specific object C1 included in the contact interface toward the icon corresponding to the alarm function, the controller 180 may transmit a message having a reception time set by the icon corresponding to the alarm function to the reception side terminal corresponding to the specific object C1 (FIG. 12(d)). Accordingly, the terminal received the message may provide the transmitted drawing on the screen when a predetermined alarm is output.

Referring to FIG. 13, an input for selecting a fifth graphic object 22 in a user interface for setting a message reception time may be received (FIG. 13(a)). The fifth graphic object 22 may be an object associated with a call connection.

In the case that the fifth graphic object 25 is selected, the controller 180 may provide a screen for setting a message (including a drawing) to be output when the reception side terminal receives a specific call. For example, when a call is received from the mobile terminal 100, the transmitted message (including drawing) can be output (25a), or when a call is received from all contacts stored in the reception side terminal, the transmitted message (including drawings) can be output 25b. (FIG. 13(b))

The controller 180 may display the fifth graphic object 25 in the contact interface (FIG. 13(c)). When receiving a drag input that associates the specific object C1 included in the contact interface with the fifth graphic object 25, the controller 180 may transmit a message having a reception time set by the fifth graphic object 25 to the reception side terminal corresponding to the specific object C1 (FIG. 13(d)). Accordingly, when the reception side terminal receives a call from a predetermined specific person, the reception side terminal may display the transmitted message (including drawing) on the screen. At this time, the delivered drawing may be displayed on the call waiting screen of the receiving terminal.

Referring to FIG. 14, an input for selecting a third graphic object 23 in a user interface for setting a message reception time may be received (FIG. 14(a)). The third graphic object 23 is an object for setting the event that the reception side terminal is worn by the user as a message reception time when the reception side terminal is a wearable device.

The controller 180 may display a guide G on the touch screen 151 to guide a method of setting a message reception time through the third graphic object 23 when the third graphic object 23 is selected (FIG. 14(b)).

The controller 180 may display the third object 23 on the contact interface (FIG. 14(c)). When receiving a drag input for associating a specific object C1 included in the contact interface with the third object 23, the controller 180 may transmit a message having a reception time set by the third object 23 to the reception side terminal corresponding to the specific object C1 (FIG. 14(d)). Accordingly, even if the receiving terminal, the wearable device receives the message, it does not display the message (including the drawing) on the screen until the user wears the wearable device. When the user of the reception side terminal wears the wearable device, it can display the transmitted message (including drawing) on the screen.

Referring to FIG. 15, a message application icon may be selected in a user interface for setting a message reception time (FIG. 15(a)). The message reception time set through the message application icon may mean displaying a message (including a drawing) on the screen when the reception side terminal receives the predetermined message.

On the other hand, the controller 180 provides a preview of the reception side terminal on the touch screen 151 so that the user can edit the configuration that the completed drawing is displayed on the display of the reception side terminal through the preview screen. That is, the controller 180 may receive the drag input for moving the drawing S1 displayed at the first position on the preview screen to the second position (FIG. 15(b)).

On the other hand, when the long touch input is received on the drawing S1 (FIG. 15(c)), the controller 180 may enter an edit mode capable of changing the size of the drawing S1 (FIG. 15(d)). The controller 180 may determine that the editing of the drawing S1 is finished by receiving the flicking input on the touch screen 151 (FIG. 15(e)), and provide the contact interface on the touch screen 151 (FIG. 15(f)). The process of transmitting a message set at the time of message reception at the contact interface to a specific recipient is as described above.

FIGS. 16A and 16B for explaining an example in which the user of the mobile terminal sets the reception time differently according to the drawing to be transmitted according to the first embodiment of the present invention.

According to an embodiment of the present invention, the touch screen 151 may be displayed an interface capable of setting different message reception times according to the degree of urgency of a message transmitted to the reception side terminal. On the other hand, when the message is outputted from the reception side terminal according to the degree of urgency of the message, the controller may output a vibration or a sound together.

Referring to FIGS. 16A and 16B, a user interface for setting a message reception time may include a plurality of objects 31, 32, and 33.

If the first object 31 is selected and the emergency message is transmitted to the receiving terminal 200 but there is no response from the receiving terminal 200, the controller 180 outputs the message (including drawing) on the screen as soon as the receiving terminal 200 receives the message and causes the predetermined vibration signal V1 and the sound signal V2 to be output together, so that the user can be informed.

When the second object 32 is selected and the user of the receiving terminal 200 does not check the message for a predetermined time, the controller may automatically output a message (including drawing) on the screen, and the predetermined vibration signal V1 together.

In the case of the third object 33, it may not be the case that the urgency of the message is low so that a specific time is set, or a vibration signal and a sound signal are output together. FIG. 16A indicates the external terminal 200 is a watch type device and FIG. 16B indicates the external terminal 200 is a mobile phone FIGS. 17 to 23 are views illustrating an example in which a message created according to the first embodiment of the present invention is displayed on a reception side terminal.

As described above, the mobile terminal 100 can be set to be determined by an event generated at the reception side terminal as a message reception time.

Referring to FIG. 17, the mobile terminal 100 may set a message reception time through the first graphic object 21 and transmit a message (including a drawing) to the reception side terminal 200 as described with reference to FIG. 10A. The reception side terminal 200 may receive the message in the power off state and may display the received message (including drawing) on the screen when the power supply is turned on. Also, when the drawing is displayed and the flicking input is received, the displayed drawing can be cleared.

Referring to FIG. 18, the mobile terminal 100 may transmit a message (including a drawing) to the reception terminal 200 by setting a message reception time through the fourth graphic object 24, as described with reference to FIG. 11. The reception side terminal 200 may detect a movement of the terminal through a motion recognition module. When the reception side terminal 200 detects a predetermined gesture, the reception side terminal 200 may provide the received message (including drawing) on the screen. The received message (including drawing) may be displayed on the screen and a predetermined notification sound may be output together.

Referring to FIG. 19, as described with reference to FIG. 12, the mobile terminal 100 may transmit a message (including a drawing) to the reception side terminal 200 by setting a message reception time using an alarm icon. When the predetermined alarm is output from the reception side terminal 200, the received message (including drawing) may be displayed on the screen. The received message (including drawing) may be displayed on the screen and a predetermined notification sound may be output together.

Referring to FIG. 20, the mobile terminal 100 may transmit a message (including a drawing) to the reception side terminal 200 by setting a message reception time through the fifth graphic object 25, as described with reference to FIG. The reception side terminal 200 can receive the call from the predetermined call receiver and display the received message (including the drawing) on the call waiting screen. Meanwhile, when the received call is ended by connecting or rejecting the call received from the reception side terminal 200, the displayed drawing can be cleared.

Referring to FIG. 21, the mobile terminal 100 may transmit a message (including a drawing) to a reception side terminal by setting a message reception time through the third object 23. The reception side terminal 200 may be a wearable device (for example, a smart watch) and may include a sensor capable of detecting whether the user wears the wearable device. The sensor may be provided on a band to detect whether or not the band is coupled. When the reception side terminal 200 determines that the user wears the terminal, the reception side terminal 200 may provide the received message (including drawing). The alarm sound can be outputted together with the display of the drawing.

Referring to FIG. 22, the mobile terminal 100 may transmit a message (including a drawing) to the reception side terminal by setting a message reception time through a message icon A2. The mobile terminal 100 may transmit a message generated through the message application to the reception side terminal 200 and the reception side terminal 200 may display the message generated through the message application on the display. That is, even if the reception side terminal 200 receives a message different from the drawing from the mobile terminal 100, the reception side terminal 200 may provide the drawing on the screen based on the message reception time when displaying the received message.

On the other hand, the reception side terminal 100 may control the display so that the drawing does not overlap with the message while displaying the message received through the separate message application on the display.

Referring to FIG. 23, the mobile terminal 100 may transmit a message (including a drawing) to a reception side terminal by setting a message reception time through the sixth graphic object 26. FIG. The reception side terminal 200 may display the received message (including drawing) when the locked state is released through input of a predetermined unlock pattern in the lock mode. In this case, an alarm sound can be output together.

FIG. 24 is a view for explaining a process of storing a sketch generated according to the first embodiment of the present invention in the reception side terminal.

Referring to FIG. 24, according to an embodiment of the present invention, the reception side terminal 200 receives a message (including a drawing). If the predetermined message reception time is satisfied, the received drawing can be displayed on the display. When a predetermined touch input (for example, a long touch input) is received on the drawing displayed on the reception side terminal 200, the reception side terminal 200 may store the drawing as a separate image file.

On the other hand, when the reception side terminal 200 desires to generate a drawing, the pre-stored drawing can be read from the memory. For example, when the reception side terminal 200 receives the atypical scrub gesture for entering the drawing mode while the power of the display unit is off, the receiving terminal 200 may enter the drawing mode and provide the drawing pad to the display. When the reception side terminal 200 receives a predetermined input (for example, a long touch input) with respect to the drawing pad, the reception side terminal 200 may read at least one drawing previously stored in the memory and display it on the display.

FIG. 25 is a view for explaining an example of displaying a creation process of a sketch according to the first embodiment of the present invention at a reception side terminal.

Referring to FIG. 25, the mobile terminal 100 according to an embodiment of the present invention can record a process of drawing via the drawing pad. The recording may be implemented by a screen recording method. That is, a moving object, a screen change, and the like displayed on the display can be recorded and stored in real time. The controller 180 may attach the recorded file to the message (including drawing) and transmit the attached file to the reception side terminal 200.

The reception side terminal 200 may display the received message (including the drawing) on the display when the predetermined receiving time is satisfied. In this state, when the user take a gesture to shake the reception side terminal 200, the recording file can be reproduced on the display unit. Accordingly, the process of creating a drawing in the mobile terminal 100 can be reproduced on the reception side terminal 200. On the other hand, when the user takes a gesture to shake the receiving terminal once again, it is possible to end the reproduction of the recording file and return to the previously displayed drawing screen.

FIG. 26 is a view illustrating an example of receiving feedback when a sketch created according to the first embodiment of the present invention is checked at the reception side terminal.

Referring to FIG. 26, the reception side terminal 200 may receive a drawing (message) having a message reception time from the mobile terminal 100, and display the drawing on the display based on a predetermined message reception time. Meanwhile, the reception side terminal 200 may provide the display with a user interface for transmitting a feedback message to the mobile terminal 100 indicating that a drawing message (drawing) has been received. The user interface may include objects (OK, NO) for selecting whether to transmit a feedback message to the mobile terminal 100, objects (Good or Bad) capable of transmitting an emotion state of the received drawing message as feedback. When the feedback message of the message receiver is transmitted to the mobile terminal 100 through the user interface of the reception side terminal 200, the feedback message may be displayed on the mobile terminal 100.

The above-described method for controlling the mobile terminal according to the present invention can be provided by being recorded in a computer-readable recording medium as a program to be executed by a computer.

The control method of the mobile terminal according to the present invention can be executed through software. When executed in software, the constituent means of the present invention are code segments that perform the necessary tasks. The program or code segments may be stored in a processor readable medium or transmitted by a computer data signal coupled with a carrier wave in a transmission medium or a communication network.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A mobile terminal comprising:
a wireless communication unit configured to provide wireless communication;
a touch screen; and
a controller configured to:
display a drawing pad on the touch screen in response to a predetermined input;
display a user interface on the touch screen to set a display time at which a drawing drawn on the drawing pad is displayed at a reception side terminal; and
transmit a message including the drawing to the reception side terminal, via the wireless communication unit, so the drawing is displayed on the screen of the reception side terminal at the display time set in the user interface,
wherein the set display time is based on an event occurring at the reception side terminal, and
wherein the controller is further configured to:
display at least one object on the touch screen corresponding to at least one event generated in the reception side terminal; and
in response to a selection of a first object corresponding to a first event occurring on the reception side terminal, transmit a control signal, via the wireless communication unit, to the reception side terminal to display the message on the screen of the reception side terminal at a time when the first event is generated in the reception side terminal.

2. The mobile terminal of claim 1, further comprising:
a watch type body on which the touch screen is disposed; and
a band, which is worn on a wrist, connected to the body,
wherein the controller is further configured to:
display a color picker on the drawing pad along a rim of the touch screen; and
create the drawing with a color selected using the color picker.

3. The mobile terminal of claim 2, wherein the controller is further configured to display the drawing pad on the touch screen when a predetermined gesture is input on the touch screen in a lock mode or in a clock mode.

4. The mobile terminal of claim 3, wherein the predetermined gesture comprises a scrub gesture input in an atypical pattern on the touch screen.

5. The mobile terminal of claim 1, wherein the event is an event that the reception side terminal is powered on.

6. The mobile terminal of claim 1, wherein the event is an event that a gesture set in the user interface is detected in the reception side terminal.

7. The mobile terminal of claim 1, wherein the event is an event in which an application set in the user interface is executed in the reception side terminal.

8. The mobile terminal of claim 1, wherein the event is an event in which a call is received from a caller set in the user interface.

9. The mobile terminal of claim 1, wherein the event is an event that the reception side terminal, which is a wearable device, is worn by a user.

10. The mobile terminal of claim 1, wherein the event is when an unidentified communication history of a communication event received from the mobile terminal exceeds a predetermined number of times.

11. The mobile terminal of claim 1, wherein the controller is further configured to:
display a screen configuration of the reception side terminal provided with the drawing as a preview on the touch screen; and edit at least one of a position and a size of the drawing to be displayed on the screen of the reception side terminal in response to a touch input.

12. The mobile terminal of claim 1, wherein the controller is further configured to receive a feedback message, via the wireless communication unit, from the reception side terminal when the drawing is displayed at the reception side terminal.

13. The mobile terminal of claim 1, wherein the controller is further configured to transmit a file recorded with a creation process of the drawing on the drawing pad, via the wireless communication unit, to the reception side terminal together with the message.

14. The mobile terminal of claim 1, wherein the controller is further configured to:
  display at least one contact object on the touch screen; and
  in response to an input associating a first contact object with the first object, display the drawing on the screen of the reception side terminal at a time when the first event occurs at the reception side terminal corresponding to the first contact object.

15. The mobile terminal of claim 1, wherein the controller is further configured to:
  transmit the message including the drawing before the display time set in the user interface and then transmit a control signal to the reception side terminal at the display time so the reception side terminal displays the drawing at the display time set in the user interface; or
  transmit the message including the drawing at the display time set in the user interface so the reception side terminal displays the drawing at the display time set in the user interface; or
  transmit the message including the drawing and reception side control information before the display time set in the user interface so the reception side terminal displays the drawing at the display time set in the user interface based on the transmitted reception side control information.

16. A mobile terminal comprising:
  a wireless communication unit configured to provide wireless communication;
  a touch screen; and
  a controller configured to:
  receive, via the wireless communication unit, a message from a transmission side terminal including a drawing drawn on a user interface on a touch screen of the transmission side terminal along with a set display time at which the drawing is to be displayed on a touch screen of a reception side terminal; and
  display the drawing included in the received message on the touch screen when set display time is detected,
  wherein the set display time comprises at least one of a first event in which the mobile terminal is powered on, a second event in which the mobile terminal detects a gesture set in the transmission side terminal, a third event in which the application set in the transmission side terminal is executed in the mobile terminal, a fourth event in which a call is received from a caller set at the transmission side terminal, and a fifth event in which an wearable device is worn by a user when the mobile terminal is the wearable device.

17. The mobile terminal of claim 16, further comprising:
  at least one of an audio output module, a haptic module and an optical output module,
  wherein the controller is further configured to output at least one of a predetermined sound via the audio output module when the drawing is displayed on the touch screen, a predetermined vibration pattern via the haptic module and a predetermined optical signal via the optical output module.

18. A method for controlling a mobile terminal, the method comprising:
  displaying a user interface on the touch screen to set a display time at which a drawing drawn on the drawing pad is displayed at a reception side terminal;
  displaying a user interface on the touch screen to set a message reception time at which a message including the drawing drawn on the drawing pad is received at the reception side terminal;
  transmitting, via a wireless communication unit, a message including the drawing to the reception side terminal, so the drawing is displayed on the screen of the reception side terminal at the display time set in the user interface;
  displaying at least one object on the touch screen corresponding to at least one event generated in the reception side terminal; and
  transmitting a control signal, in response to a selection of a first object corresponding to a first event occurring on the reception side terminal, via the wireless communication unit, to the reception side terminal to display the message on the screen of the reception side terminal at a time when the first event is generated in the reception side terminal,
  wherein the display time is based on an event occurring at the reception side terminal.

* * * * *